United States Patent
Kani

(10) Patent No.: US 10,427,389 B2
(45) Date of Patent: Oct. 1, 2019

(54) RESIN COMPOSITION AND MULTILAYER STRUCTURE USING SAME

(71) Applicant: THE NIPPON SYNTHETIC CHEMICAL INDUSTRY CO., LTD., Osaka (JP)

(72) Inventor: Shouichi Kani, Osaka (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 36 days.

(21) Appl. No.: 15/711,371

(22) Filed: Sep. 21, 2017

(65) Prior Publication Data

US 2018/0015707 A1 Jan. 18, 2018

Related U.S. Application Data

(63) Continuation of application No. PCT/JP2016/061281, filed on Apr. 6, 2016.

(30) Foreign Application Priority Data

Apr. 7, 2015 (JP) ................................ 2015-078735
Apr. 7, 2015 (JP) ................................ 2015-078736

(51) Int. Cl.
| | | |
|---|---|---|
| *B32B 27/34* | (2006.01) | |
| *B32B 27/18* | (2006.01) | |
| *B32B 27/32* | (2006.01) | |
| *C08K 3/32* | (2006.01) | |
| *C08K 3/34* | (2006.01) | |
| *C08K 5/098* | (2006.01) | |
| *C08L 101/02* | (2006.01) | |
| *B32B 27/30* | (2006.01) | |
| *C08L 23/26* | (2006.01) | |
| *B29B 9/12* | (2006.01) | |
| *B29B 9/06* | (2006.01) | |

(52) U.S. Cl.
CPC ............... *B32B 27/34* (2013.01); *B29B 9/12* (2013.01); *B32B 27/18* (2013.01); *B32B 27/306* (2013.01); *B32B 27/32* (2013.01); *C08K 3/32* (2013.01); *C08K 3/34* (2013.01); *C08K 5/098* (2013.01); *C08L 23/26* (2013.01); *C08L 101/02* (2013.01); *B29B 9/06* (2013.01)

(58) Field of Classification Search
CPC ......... B32B 27/34; B32B 27/18; B32B 27/32; C08L 101/02; C08K 5/098; C08K 3/32; C08K 3/34
USPC ........................................................ 428/522
See application file for complete search history.

(56) References Cited

U.S. PATENT DOCUMENTS

| | | | | |
|---|---|---|---|---|
| 4,407,897 A | * | 10/1983 | Farrell ..................... | B32B 27/18 428/516 |
| 4,770,944 A | | 9/1988 | Farrell et al. | |
| 2001/0018480 A1 | * | 8/2001 | Chiang .................. | A23L 3/3436 524/417 |
| 2011/0135950 A1 | * | 6/2011 | Okamoto ............... | C08K 5/098 428/475.2 |

FOREIGN PATENT DOCUMENTS

| | | |
|---|---|---|
| JP | H02147657 A | 6/1990 |
| JP | 2002506904 A | 3/2002 |
| JP | 201059418 A | 3/2010 |
| WO | 9947596 A1 | 9/1999 |

OTHER PUBLICATIONS

Extended European Search Report for counterpart EP Application No. 16776573.4 dated Sep. 6, 2018.
International Search Report from Application No. PCT/JP2016/061281 dated May 10, 2016.
First Office Action issued in the counterpart Chinese Application No. 201680020993.6 dated Jul. 17, 2019.

* cited by examiner

*Primary Examiner* — Hui H Chin
(74) *Attorney, Agent, or Firm* — Greenblum & Bernstein, P.L.C.

(57) ABSTRACT

A resin composition which can suppress the deterioration of performances of a multilayer structure due to moisture absorption regardless that the multilayer structure includes a hygroscopic layer whose performance is deteriorated due to moisture absorption, and a multilayer structure including a layer of the resin composition, are provided. Since the resin composition contains a hydrate-forming alkaline earth metal salt having a specific water absorption property, a multilayer structure comprising a layer of the resin composition can exhibit moisture resistance as a whole of the multilayer structure without affecting the appearance thereof.

15 Claims, No Drawings

RESIN COMPOSITION AND MULTILAYER STRUCTURE USING SAME

CLAIM FOR PRIORITY

This application is a Continuation of PCT/JP2016/061281 filed Apr. 6, 2016, and claims the priority benefit of Japanese applications 2015-078735 and 2015-078736, both filed Apr. 7, 2015, the contents of which are expressly incorporated by reference herein in their entireties.

TECHNICAL FIELD

The present invention relates to a resin composition capable of providing moisture resistance and multilayer structure using the resin composition. In particular, the present invention relates to a resin composition capable of improving moisture resistance of a multilayer structure containing a layer poor in moisture resistance, as well as a multilayer structure containing a layer made of the resin composition.

BACKGROUND ART

As a wrapping film for food, a film of a thermoplastic resin is generally used. The wrapping film needs physical strength as well as gas-barrier performance such as oxygen barrier performance from the viewpoint of keeping freshness of foods. In addition, the wrapping film needs moisture resistance in order to avoid the appearance of the wrapped article from getting worse even when preserving the wrapped article for a long term under a high humidity condition such as rainy season. Furthermore, since the wrapped article may be subjected to hot water treatment such as retort treatment, the wrapping film is required for avoiding the deterioration of film strength and gas-barrier performance as well as impaired appearance of the wrapped article by the hot water treatment.

It is difficult for a single film of one kind of thermoplastic resin to satisfy these requirements, and therefor a multilayer film in which various types of resin films are laminated is usually used for a wrapping film.

For example, used is a multilayer film where a film (gas barrier layer) having gas-barrier performance is sandwiched for protection by films (protection layers) each having strength and moisture resistance, or a multilayer film in which an adhesive resin layer is imposed between the gas barrier layer and the protection layer, for improving the binding strength between them.

A typical multilayer film exhibiting gas-barrier performance is a multilayer film where a saponified ethylene-vinyl ester-based copolymer (hereinafter, referred to as "EVOH resin") used for gas barrier layer is sandwiched by polyolefin films.

However, there is known that the gas barrier performance of the wrapped article with this multilayer film employing EVOH resin for the gas-barrier layer is impaired by a hot water treatment such as retort treatment which exposes the wrapped article to hot water for long hours. The reason for the deterioration of the gas barrier performance of the multilayer film is supposed as follows: water comes into the EVOH resin layer from the outer edge of the multilayer film during the hot water treatment to destroy hydrogen bonds in EVOH resin, thereby allowing oxygen to come into the EVOH resin layer.

As a method of suppressing the deterioration of the gas barrier performance by the hot water treatment, adding a hydrate-forming metal salt as a drying agent to EVOH resin is known. A technique is also known that polyamide-based resin is added to EVOH resin to improve a resistance to hot water treatment. For instance, the patent document 1 discloses a multilayer structure employing EVOH resin layer for a gas-barrier layer, which is sandwiched with layers of thermoplastic resin containing a dehydrated disodium succinate hydrate for a drying agent, and that the multilayer structure maintained excellent gas-barrier performance after the hot water treatment.

PRIOR ART

Patent Document

[Patent document 1] JP2010-59418A

SUMMARY OF THE INVENTION

Technical Problem to be Solved by the Invention

Although the multilayer structure suggested in the patent document 1 can maintain excellent gas-barrier performance after hot water treatment, there is a drawback caused by the drying agent. The drying agent absorbs extra water beyond moisture receptivity of the thermoplastic resin when the multilayer structure is preserved under high temperature and high humidity condition, and as a result, the drying agent is dissolved. In a worse case, the dissolved drying agent transfers to the interface between the thermoplastic resin composition layer and the adhesive resin layer, which could cause delamination between the layers.

Under these situations, the present invention has been completed. The object of the invention is to provide a resin composition preventing from lowering the performances due to moisture absorption even in a multilayer structure where the resin composition layer is used together with a layer such as EVOH resin layer whose performance is impaired due to moisture absorption by improving moisture resistance of the multilayer structure as a whole, and also provide a multilayer structure using the resin composition.

Means for Solving the Problems

The present inventors have studied various drying agents to be added to the thermoplastic resin, aiming the suppression of impairing performances as a whole of the multilayer structure caused from moisture absorption in the case that the multilayer structure contains a resin layer whose performances are likely to be lowered due to moisture absorption. The inventors found that the employment of an alkaline earth metal salt having a specific water absorption property provides an entire multilayer structure with moisture resistance without affecting appearance of the multilayer structure and thereby suppressing impairing performances due to moisture absorption even when the multilayer structure contains a hygroscopic layer which is lowered in their performances due to moisture absorption, and has completed the invention.

The resin composition of the invention comprises (A) a base resin consisting of a thermoplastic resin other than a saponified ethylene-vinyl ester-based copolymer, and (B) a hydrate-forming alkaline earth metal salt satisfying water absorption property ($\alpha$) shown below:

($\alpha$) a ratio of ($X_5$) to (Y), $X_5/Y$ ranging from 0.2 to 2.0, wherein $X_5$ is an amount of water absorption for 5 days per 100 g of the alkaline earth metal salt (B) when being placed for 5 days under a condition of 40° C. and 90% relative humidity, and Y is a content of crystallization water in maximum hydrate of the alkaline earth metal salt (B).

The hydrate-forming alkaline earth metal salt (B) preferably satisfies water absorption property (β), more preferably satisfies water absorption property (γ) shown below:

(β) an amount of water absorption (Z) per 100 g of the alkaline earth metal salt (B) when being placed for 24 hours under the condition of 40° C. and 90% relative humidity is at least 10 g.

(γ) a local maximum point exists in the amount of water absorption when the hydrate-forming alkaline earth metal salt (B) is placed under the condition of 40° C. and 90% relative humidity.

Preferably, the alkaline earth metal salt (B) is a salt of acid selected from the group consisting of lactic acid, silicic acid, phosphoric acid and citric acid, or a combination thereof, and the alkaline earth metal salt is completely dehydrated or partially dehydrated up to the water content of 50% by weight or less or a combination thereof. A weight ratio (A/B) of the base resin (A) to the hydrate-forming alkaline earth metal salt (B) is preferably from more than 50/less than 50 to 99/1.

The base resin (A) may be a polyamide-based resin or an olefin-based resin, alternatively a polar group-modified polymer.

The multilayer structure of the invention comprises at least one layer of the resin composition of the invention.

The multilayer structure preferably further comprises a layer of a thermoplastic resin not containing a hydrate-forming alkaline earth metal salt (B) or a composition thereof, and more preferably comprises a unit in which the layer of the thermoplastic resin not containing hydrate-forming alkaline earth metal salt (B) or a composition thereof is arranged adjacent to the layer of the resin composition.

The thermoplastic resin preferably has 100 mL·20 μm/(m²·day·atm) or less of oxygen permeability at 20° C. and 65% relative humidity measured by isopiestic method in accordance with JIS-K7126, specifically may be a saponified ethylene-vinyl ester-based copolymer.

For the base resin (A) in the resin composition, a hydrophobic resin or a polar group-modified polymer may be preferably employed.

Effect of the Invention

Since a multilayer structure contains a hygroscopic layer whose performances may be lowered due to moisture absorption together with a layer of the inventive resin composition, the resin composition layer can impart moisture resistance as a whole of the multilayer structure. Thus the multilayer structure of the invention can avoid the deterioration of the performances due to moisture absorption without affecting its appearance.

MODES FOR CARRYING OUT THE INVENTION

Hereinafter, the present invention will be described in detail, but the description is about merely one embodiment and it will be interpreted that we do not intend to limit the invention to the embodiment.
<Resin Composition>
The resin composition of the invention comprises (A) a base resin and (B) a hydrate-forming alkaline earth metal salt having a specific water absorption property. These components will be described below.
[(A) Base Resin]

The base resin (A) used in the invention is a thermoplastic resin other than saponified ethylene-vinyl ester-based copolymer (EVOH resin).

A thermoplastic resin becomes fluid state when heated at a temperature above its melting point (in the case of crystallizable resin) or glass transition point (in the case of amorphous resin), while it becomes solidified state when cooled at a temperature below crystallization temperature (in the case of crystallizable resin) or glass transition point (in the case of amorphous resin). Such thermoplastic resin is a synthetic resin characterized by a reversible change between these states.

The thermoplastic resin used in the invention has a viscosity sufficient enough to be molded by an extruder or the like even when heating up to a temperature higher than the melting point. Specifically, the thermoplastic resin has a MFR (230° C., load of 2160 g) ranging usually from 0.01 to 200 g/10 minutes, particularly from 0.01 to 100 g/10 minutes, more particularly from 0.1 to 50 g/10 minutes.

Conventionally known thermoplastic resins may be used for the base resin (A), but a saponified ethylene-vinyl ester-based copolymer (EVOH resin) is excluded.

Accordingly, examples of the thermoplastic resin used for the base resin (A) include polyamide-based resin, olefin-based resin, polyester-based resin, polystyrene-based resin, polyvinyl chloride-based resin, polycarbonate-based resin, polyacryl-based resin, polyvinylidene chloride-based resin, vinyl ester-based resin, polyester-based elastomer, polyurethane-based elastomer, polystyrene-based elastomer, halogenated olefin-based resin such as chlorinated polyethylene and chlorinated polypropylene, polymer containing aliphatic hydrocarbon monomer unit having a carbon-carbon double bond and modified with polar group-containing compound such as maleic anhydride (hereinafter, the polymer is called as "polymer modified with polar group" or "polar group-modified polymer").

As the base resin (A), the above-mentioned thermoplastic resins may be used alone or in combination with 2 or more of them.

As the base resin (A), virgin resin as well as recycled resin which is a mixture consisting of various types of thermoplastic resins may be employed.

The thermoplastic resin is properly chosen depending on the intended use. In the case of using for a multilayer structure in which another resin film is laminated, a proper thermoplastic resin is selected based on the kind of the another resin film. In general, polyamide-based resin, olefin-based resin, polyester-based resin, and polystyrene-based resin are preferably used because of excellent thermostability and moisture resistance. In the case of using a multilayer structure to be subjected to boiling or retort treatment, polyamide-based resin and olefin-based resin are particularly chosen because of exerting notably expected effect of the invention. On the other hand, in the case of using the resin composition as an adhesive resin, aforementioned polar group-modified polymer is preferably used.

Next, polyamide-based resin, olefin-based resin, and polar group-modified polymer which are preferable thermoplastic resins will be described.
[A-1: Polyamide-Based Resin]

Examples of the polyamide-based resin include polycapramide (nylon 6), poly-ω-aminoheptanoic acid (nylon 7), poly-ω-aminononanoic acid (nylon 9), polyundecanamide (nylon 11), polylauryl lactam (nylon 12) and a like homopolymers. Examples of copolyamide-based resin include polyethylenediamine adipamide (nylon 26), poly(tetramethylene adipamide) (nylon 46), poly(hexamethylene adipamide) (nylon 66), poly(hexamethylene sebacamide) (nylon 610), poly(hexamethylene dodecamide) (nylon 612), poly(octamethylene adipamide) (nylon 86), poly(decamethylene adipamide) (nylon 108), caprolactamnlauryl lactam copolymer (nylon 6/12), caprolactam/ω-aminononanoic acid copolymer (nylon 6/9), caprolactam/hexamethylene diammonium adipate copolymer (nylon 6/66), lauryl lactam/hexamethylene diammonium adipate copolymer (nylon 12/66), ethylenediamine adipamide, hexamethylene diammonium adipate copolymer (nylon 26/66), caprolactam/hexamethylene diammonium adipate/hexamethylene diammonium sebacate copolymer (nylon 66/610), ethylene ammonium adipate/hexamethylene diammonium adipate/hexamethylene diammonium sebacate copolymer (nylon 6/66/610), and a like aliphatic copolyamide; poly(hexamethylene isophthalamide), poly(hexamethylene terephthalamide), poly(metaxylylene adipamide), hexamethylene isophthalamide/terephthalamide copolymer, poly-p-phenylene terephthalamide, poly-p-phenylene-3,4'-diphenyl ether terephthalamide, and a like aromatic polyamide; amorphous polyamide, polyamide-based resin modified with aromatic amine such as methylenebenzylamine or metaxylenediamine; metaxylylene diammonium adipate and so on. Terminal-modified polyamide-based resin in which the aforementioned polyamide-based resin is modified at the terminal thereof may be included. These polyamide-based resins may be used alone or in combination of them.

These polyamide-based resins may have a relatively high bonding strength to a polar group-modified resin such as EVOH resin, and therefore preferably may be used for improving moisture resistance of a multilayer structure containing a layer of resin containing polar group.

The amide bond ratio to the polyamide resin molecule is from 20% to 60%, preferably from 30% to 50%, particularly preferably from 35% to 45%, in terms of molecular weight of amide bond (—CONH—) per 1 unit of polyamide (e.g. [—$C_6H_5$—CONH—] in the case of nylon 6). Unduly low amide bond ratio tends to lower the binding strength at interface between the polyamide and polar resin such as EVOH resin. On the contrary, when the amide bond ratio is unduly high, reactivity with polar resin such EVOH resin becomes high to lead a defective appearance due to disturbed interface when being extruded.

The polyamide resin has a melting point of 160 to 270° C., preferably 180 to 250° C., particularly preferably 200 to 230° C. A polyamide resin having too low melting point may cause to impair the thermostability of the resultant multilayer structure. On the other hand, a polyamide resin having too high melting point results in a large difference from that of the resin used for other layer in the case of multilayer structure comprising other resin layer. This may generate turbulent flow at joining in the case of coextrusion with other resin, resulting in production of a multilayer structure with lowered appearance. Furthermore, the die temperature to be set when coextruding with EVOH resin composition is relatively high, EVOH resin may be easily subjected to thermal deterioration.

From the above-mentioned viewpoints, a preferable polyamide resin has a melting point of 160 to 270° C., preferably 180 to 250° C., particularly preferably 200 to 230° C., and has an amide bond ratio of 20% to 60%, preferably 30% to 50%, particularly preferably 35% to 45%. Preferable examples of the polyamide are nylon 6 (melting point: about 220° C., amide bond ratio: 38%) and nylon 6/66 (melting point: about 200° C., amide bond ratio: 38%).

The polymerization degree of the polyamide-based resin is in the range of usually 1.5 to 6.0, preferably 2.0 to 6.0, more preferably 2.5 to 5.0, as a relative viscosity measured based on JIS K6810. Unduly low relative viscosity causes to make an extruder high torque state when molding, which means difficulty in extrusion molding. Unduly high relative viscosity tends to lower the accuracy of thickness of the resulting film or sheet. The measurement of the relative viscosity in accordance with JIS K-6810 is conducted by completely dissolving 1 g of polyamide-based resin in 100 ml of concentrated sulfuric acid (concentration of 96%) and measuring at 25° C. with capillary viscometer.

[A-2: Olefin-Based Resin]

The olefin-based resin is a lipophilic polymer in which main chain is constructed by only carbon-carbon bond. The olefin-based resin has a molecular weight of usually 10000 or more, and is obtained by polymerizing olefin as a main monomer, which is an aliphatic hydrocarbon monomer having carbon-carbon double bond. Examples of the olefin-based resin may be polyolefin, olefin-vinyl ester copolymer, olefin-based thermoplastic elastomer, olefin-(meth)acrylate copolymer, and ionomer.

Of these, when the use requires boiling or retort treatment, polypropylene-based resin and cyclic olefin-based resin are preferably used as a hydrophobic resin. If such hydrophobic resin is combined with a layer of resin having inferior moisture resistance, water or moisture coming from outside into a resin layer lack of moisture resistance during hot water treatment can be reduced. Employment of an inventive resin composition layer in a multilayer structure containing a resin layer having poor hygroscopicity can improve the moisture resistance of the multilayer structure.

Examples of the polyolefin are, for instance, homopolymer of olefin monomer such as ethylene, propylene, butene and the like: and random or block copolymer of two or more such olefins. The olefin homopolymer includes, for instance, polyethylene such as ultra low density polyethylene, (linear) low density polyethylene, high density polyethylene, polypropylene, polybutene, polymethyl pentene, and the like.

The olefin block copolymer includes ethylene-α-olefin copolymer such as ethylene-propylene copolymer, ethylene-butene copolymer, ethylene-hexene copolymer, and ethylene-octene copolymer; propylene α-olefin copolymer such as propylene-ethylene copolymer, and propylene-butene copolymer; butene-α-olefin copolymer such as butene-ethylene copolymer, and butene-propylene copolymer, and the like.

The olefin random copolymer may be obtained by random copolymerizing two or more of the above-mentioned olefin monomers. Examples of the olefin random copolymer are, for instance, random copolymer of two or more α-olefins such as ethylene-α olefin random copolymer, propylene-α olefin random copolymer, and butene-α olefin random copolymer; olefin-cyclic olefin copolymer such as ethylene-norbornene olefin copolymer.

A known cyclic olefin-based resin (refer to, for instance, JP2003-103718A, JP H5-77776A, and JP2003-504523A) may be employed for the cyclic olefin-based resin. Such cyclic olefin-based resin has a lower humidity permeation than linear aliphatic polyolefin such as polyethylene and polypropylene.

The olefin-vinyl ester copolymer include, for instance, ethylene-vinyl acetate copolymer having 70 mol % or more of ethylene content, saponified ethylene-vinyl acetate copolymer having 70 mol % or more of ethylene content, and so on.

The olefin-based thermoplastic elastomer is a thermoplastic elastomer which contains a hard segment of polyolefin (e.g. polyethylene or polypropylene etc.) and a soft segment of the aliphatic-based rubber (e.g. EPDM or EPM etc.). The olefin-based thermoplastic elastomer includes a compound type one produced by compounding polyolefin and aliphatic-based rubber, and a reactor type one produced by introducing aliphatic rubber into the polyolefin during olefin polymerization. The compound type one is classified into a simply blended product (non-crosslinked) and a dynamic vulcanized product (wholly crosslinked and partially crosslinked type).

Examples of the olefin-(meth)acrylate copolymer are, for instance, ethylene-methyl acrylate copolymer, ethylene-ethyl acrylate copolymer, and ethylene-methyl methacrylate copolymer.

The ionomer resin is a metal salt of ethylene-unsaturated carboxylic acid copolymer wherein the carboxyl group is neutralized by the metal.

Of these, polyethylene, polypropylene, ethylene-α olefin block copolymer, propylene-α olefin block copolymer, ethylene-α olefin random copolymer, propylene-α olefin random copolymer, and ethylene-vinyl acetate copolymer is preferred from the viewpoint of thermostability. In the case of focusing on hot water resistance and moisture resistance, aliphatic polyolefin such as polypropylene, propylene-α olefin block copolymer, and propylene-α olefin random, and cyclic polyolefin are preferred.

The olefin-based resin has a melt flow rate (MFR: 210° C., load of 2160 g) ranging from usually 0.01 to 150 g/10 minutes, preferably 0.1 to 50 g/10 minutes, more preferably 0.5 to 25 g/10 minutes, particularly preferably 1 to 10 g/10 minutes, and MFR (230° C., load of 2160 g) ranging from usually 0.01 to 200 g/10 minutes, preferably 0.5 to 35 g/10 minutes, particularly preferably 1 to 15 g/10 minutes.

[A-3: Polar Group-Modified Polymer]

The polar group-modified polymer is a polymer which contains aliphatic hydrocarbon monomer units having carbon-carbon double bonds, and the polymer is modified with a polar group-containing compound. The polar group-modified polymer is one of thermoplastic resins.

(1) Polar Group-Containing Compound

The polar group-containing compound is a compound having a polar group such as carboxyl group, amino group, alkoxyl group, hydroxyl group, amide group, epoxy group, or a like group. Acid anhydride is included in the caroboxyl group as a derivative thereof.

A polar group-containing compound used for carboxyl group modification includes an unsaturated carboxylic acid or its derivative, preferably, for instance. α,β-unsaturated carboxylic acid, or α,β-unsaturated carboxylic acid anhydride. Examples of the α,β-unsaturated carboxylic acid include α,β-unsaturated monocarboxylic acid such as acrylic acid, methacrylic acid, and α,β-unsaturated di-carboxylic acid such as maleic acid, succinic acid, itaconic acid, phthalic acid, and the like. Examples of the derivative of α,β-unsaturated carboxylic acid include α,β-unsaturated monocarboxylic acid ester such as glycidyl acrylate, glycidyl methacrylate, hydroxyethyl acrylate, and hydroxymethyl methacrylate, and the α,β-unsaturated di-carboxylic acid anhydride such as maleic anhydride, succinic anhydride, itaconic anhydride, and phthalic anhydride, and so on.

A polar group-containing compound used for amino group modification includes 3-lithio-1-[N,N-bis(trimethylsilyl)] aminopropane, 2-lithio-1-[N,N-bis(trimethylsilyl)] aminoethane, 3-lithio-2,2-dimethyl-1-[N,N-bis (trimethylsilyl)] aminopropane, and the like. An unsaturated amine such as vinyl amine or derivative thereof is also included.

A polar group-containing compound used for alkoxyl group modification includes an alkoxy silane such as tetraethoxysilane, tetramethoxysilane, methyl triethoxy silane, methyl trimethoxy silane, dimethyl diphenoxy silane, and the like. Examples of the unsaturated alkoxide or derivative thereof are, for instance, alkyl vinyl ether such as methyl vinyl ether, ethyl vinyl ether, propyl vinyl ether, butyl vinyl ether, isobutyl vinyl ether, pentyl vinyl ether, hexyl vinyl ether, and the like.

A polar group-containing compound used for hydroxyl group modification includes, for instance, an unsaturated alcohol or a derivative thereof, 3-buten-1-ol, 4-penten-1-ol, 5-hexen-1-ol, and the like.

A polar group-containing compound used for amide group modification includes, for instance, an unsaturated amide or a derivative thereof. Examples of the unsaturated amide are N-vinyl formamide, N-vinyl acetoamide, N-methyl-N-vinyl formamide, N-methyl-N-vinyl acetoamide, diacetone acrylamide, acrylamide, methacryl amide, polyoxyalkylene (meth)acrylamide such as polyoxyethylene (meth)acrylamide and polyoxypropylene (meth)acrylamide, and the like.

A polar group-containing compound used for epoxy group modification includes, for instance, unsaturated epoxide such as vinylepoxide or a derivative thereof, and the like.

(2) "Polymer (p) Containing Aliphatic Hydrocarbon Monomer Unit Having Carbon-Carbon Double Bond" to be Modified with a Polar Group-Containing Compound (which is Sometimes Simply Called as "Polymer (p)")

The polymer (p) containing a unit derived from aliphatic hydrocarbon monomer unit having carbon-carbon double bond is a polymer obtained by polymerizing at least aliphatic hydrocarbon monomer having carbon-carbon double bond. Hereinafter, the aliphatic hydrocarbon monomer having carbon-carbon double bond is simply called as "unsaturated aliphatic hydrocarbon compound" or "unsaturated aliphatic hydrocarbon monomer" unless specifically indicated. The polymer (p) may contain another monomer unit other than the unit derived from aliphatic hydrocarbon monomer having carbon-carbon double bond, and therefore thermoplastic elastomer, ionomer or the like are also included in the polymer (p).

The unsaturated aliphatic hydrocarbon monomer include, for instance, carbon-carbon double bond-containing monomer such as olefin monomer, diene monomer, and so on.

Accordingly, the "polymer (p) containing a unit derived from aliphatic hydrocarbon monomer having carbon-carbon double bond" include, for instance, olefin-based polymer primarily consisting of the above-mentioned unsaturated aliphatic hydrocarbon monomer unit, random or block copolymer of the olefin-based polymer and other monomer such as vinyl aromatic-based monomer. A preferable example includes styrene-based thermoplastic elastomer (pS) or olefin-based polymer (pO).

(2-1) Olefin-Based Polymer (pO)

The olefin-based polymer (pO), which is modified with a polar group, may employ olefin-based resins enumerated for the (A-2) olefin-based resin used for the base resin (A). That is to say, a lipophilic polymer whose main chain consists of carbon-carbon bond and whose molecular weight is usually from 10000 or more may be used as the olefin-based polymer (pO). The lipophilic polymer is generally obtained by polymerizing an aliphatic hydrocarbon monomer corresponding to olefin as a main monomer. The olefin-based polymer (pO) may be polyolefin, olefin-vinyl ester copolymer, olefin-based thermoplastic elastomer, olefin-(meth)acrylate copolymer, and ionomer.

Specific examples included in the olefin-based polymer (pO) are referred to ones enumerated as A-2.

(2-2) Styrene-Based Thermoplastic Elastomer (pS)

Styrene-based thermoplastic elastomer (pS) comprises a polymer block (b1) composed of a polymer of aromatic vinyl-based monomers (hereinafter, occasionally referred to as "aromatic vinyl polymer block") and a polymer block (b2) composed of a polymer of unsaturated aliphatic hydrocarbon monomers (hereinafter, occasionally referred to as "aliphatic hydrocarbon polymer block") and/or hydrogenated polymer thereof, wherein the polymer block (b1) usually acts as a hard segment and the polymer block (b2) usually acts as a soft segment.

As the styrene-based thermoplastic elastomer (pS), a polymer comprising the aromatic vinyl polymer block (b1) and the aliphatic hydrocarbon polymer block and/or its hydrogenated block (b2) may be used, and generally available styrene-based thermoplastic elastomer may be also used. The combination structure of the polymer block b1 and the polymer block b2 includes, but is not specifically limited to, a di-block structure represented by b1-b2, tri-block structure represented by b1-b2-b1 or b2-b1-b2, tetra-block structure represented by b1-b2-b1-b2, and poly block structure where not less than five blocks of b1 and/or b2 are bonded to form straight-chain. Of these, the di-block structure (b1-b2), tri-block structure (b1-b2-b1), and tetra-block structure (b1-b2-b1-b2) are preferred in view of flexibility and mechanical properties.

Constituent monomers of the aromatic vinyl polymer block (b1), that is, aromatic vinyl-based monomers include, for instance, styrene, styrene derivatives such as a-methyl styrene, β-methyl styrene, o-methyl styrene, m-methyl styrene, p-methyl styrene, t-butyl styrene, 2,4-dimethyl-styrene, 2,4,6-trimethyl styrene, monofluorostyrene, difluorostyrene, monochlorostyrene, dichlorostyrene, and methoxystyrene; and aromatic vinyl compounds such as vinyl naphthalene, vinyl anthracene, indene, and aceto naphthylene. Other monomers copolymerizable with an aromatic vinyl-based monomer, such as 1-butene, pentene, hexane, butadiene, isoprene, methyl vinyl ether or the like, may be also used when necessary.

Of these aromatic vinyl-based monomers, styrene and styrene derivatives are preferably used, and styrene is more preferably used.

The aromatic vinyl polymer block (b1) may be a block of homopolymer of the aromatic vinyl-based monomer, or a block of copolymer of two or more kinds of the aromatic vinyl-based monomers.

In the case where the aromatic vinyl polymer block (b1) contains other copolymerizable monomers, the content ratio of the other copolymerizable monomers is preferably 10% by weight or less, more preferably 5% by weight or less, based on the weight of the aromatic vinyl polymer block (b1), so that the elastomer property of the styrene-based thermoplastic elastomer (pS) is not impaired.

An unsaturated aliphatic hydrocarbon monomer as a constituent of the aliphatic hydrocarbon polymer block (b2) is an unsaturated aliphatic hydrocarbon compound having usually from 2 to 10 carbon atoms. Specific examples of the unsaturated aliphatic hydrocarbon compound are alkene having from 2 to 6 carbon atoms, diene having from 4 to 6 carbon atoms, and conjugated diene having from 4 to 6 carbon atoms. Of these, the conjugated diene having from 4 to 6 carbon atoms is preferably used.

Examples of the conjugated diene compound are, for instance, isoprene, butadiene, hexadiene, 2,3-dimethyl-1,3-butadiene, 1,3-pentadiene and so on. Examples of the diene compound are hexanediene and so on. The aliphatic hydrocarbon polymer block (b2) may adopt a compound obtained by hydrogenating the polymer block composed of the conjugated diene compound. Examples of the alkene are ethylene, propylene, n-butylenes, and isobutylene. The aliphatic hydrocarbon polymer block obtained by hydrogenating the polymer block composed of the conjugated diene or the diene, which is a polymer block composed of the above-mentioned alkenes, may be adopted as an aliphatic hydrocarbon polymer block (b2).

The aliphatic hydrocarbon polymer block (b2) may be a homopolymer block of the unsaturated aliphatic hydrocarbon monomers, or a random copolymer block of two or more kinds of the unsaturated aliphatic hydrocarbon monomers. A preferable soft segment is a polymer block composed of the conjugated diene or hydrogenated block thereof.

The hydrogenated block of the aliphatic hydrocarbon polymer block may be obtained by hydrogenating a part or all of unsaturated bonds in the polymer block of diene and/or conjugated diene. For instance, ethyleneutylene polymer block or butadiene/butylene polymer block may be obtained by hydrogenation of the polybutadiene block. Ethylene/propylene polymer block may be obtained by hydrogenation of polyisoprene block. Hydrogenation may be performed by a known method. A selective hydrogenation of specific vinyl bonds is allowed to be performed.

The styrene-based thermoplastic elastomer (pS) is a polymer wherein the (b1) aromatic vinyl polymer block and the (b2) polymer block of the unsaturated aliphatic hydrocarbon or hydrogenated block thereof are linked. The linkage structure of the blocks includes, for instance, but is not limited to, radial tele-block copolymer, multi-block copolymer, bimodal copolymer, and taper block copolymer etc.

The content of the aromatic vinyl polymer block (b1) in the styrene-based thermoplastic elastomer (pS) is in the range of usually 5 to 50% by weight, preferably 10 to 40% by weight, more preferably 10 to 35% by weight, and further more preferably 15 to 35% by weight. When the content of the polymer block (b1) is unduly high, flexibility of the styrene-based thermoplastic elastomer (pS) itself is decreased. When the content of the polymer block (b1) is unduly low, transparency of the resulting film tends to be lowered.

Also, the content of the aliphatic hydrocarbon polymer block and/or the hydrogenated block thereof (b2) in the styrene-based thermoplastic elastomer (pS) is in the range of usually 50 to 95% by weight, preferably 60 to 90% by weight, and more preferably 65 to 90% by weight.

Examples of such styrene-based thermoplastic elastomer (pS) are styrene-butadiene-styrene block copolymer (SBS), styrene-isoprene-styrene block copolymer (SIS), hydrogenated SBS (SEBS), hydrogenated SIS (SEPS), hydrogenated block copolymer of vinyl components of butadiene block contained in SBS (SBBS), styrene-isobutylene-styrene triblock copolymer (SIBS), styrene-ethylene-butylene-crystallinity polyolefin block copolymer (SEBC) and the like. Of these, SEBS is preferably used due to superior thermal stability and weather resistance. SEBS has ethylene/butylene copolymer block derived from hydrogenated polybutadiene block.

Also, if desirable, the polymer blocks (b1) and (b2) each may be a random copolymer block containing other copolymerizable monomers. In the case that the other copolymerizable monomers are contained, the content of the copolymerizable monomers is preferably 10% by weight or less, and more preferably 5% by weight or less, based on the weight of the each polymer block.

(3) Chemical Structure of Polar Group-Modified Polymer

Synthesis of such polar group-modified polymers or modification of the aforementioned polymer (pO or pS) with polar group-containing compound, is conducted by a method of copolymerizing polar group-containing compound with constituent monomers of the polymer (pO or pS), a method of introducing polar group-containing compound into a side chain of the polymer by radical addition and so on, or post-modification of a polymer containing a unit of aliphatic hydrocarbon monomer having carbon-carbon double bond, or the like.

The content of the polar group derived from the polar group-containing compound in the polar group-modified polymer is normally from $0.1 \times 10^{-3}$ to 1 mmol/g, preferably from $0.5 \times 10^{-3}$ to 0.5 mmol/g, more preferably from $1 \times 10^{-2}$ to 0.2 mmol/g, and furthermore preferably from $1 \times 10^{-2}$ to 0.1 mmol/g. An unduly high content of the polar groups may enhance the reactivity to hydrophilic resin such as EVOH resin, and thereby leading a defective appearance due to disturbed interface when being coextruded. An unduly low content of the polar groups tends to decrease binding strength to hydrophilic resin such as EVOH resin.

In the case where the polar group-modified polymer is a carboxyl group-modified styrene-based thermoplastic elastomer, the carboxyl group content is normally not larger than 20 mg $CH_3ONa/g$, preferably from 1 to 15 mg $CH_3ONa/g$, and more preferably from 1 to 5 mg $CH_3ONa/g$ in the acid value measured by a titration method.

An unduly high acid value may enhance reactivity to hydrophilic resin such as EVOH resin, and thereby leading a defective appearance due to disturbed interface when being coextruded. An unduly low content of the polar group content tends to decrease binding strength to hydrophilic resin such as EVOH resin.

The polar group-modified styrene-based thermoplastic elastomer has a melt flow rate (MFR) under the condition of 230° C. with load of 2160 g, is from usually 0.01 to 200 g/10 minutes, preferably 0.1 to 100 g 10 minutes, more preferably 1 to 50 g/10 minutes, particularly preferably 2 to 15 g/10 minutes.

As such polar group-modified styrene-based thermoplastic elastomer, a commercially available one may be used. For instance, "Tuftec™" M series from Asahi Kasei Corporation, "Kraton FG series from Kraton Performance Polymers, Inc., and "f-Dynaron" series from JSR Corporation are available as the polar group-modified styrene-based thermoplastic elastomer.

In the case that the polymer (p) is an olefin-based polymer, preferable polar group-modified polymer include typically carboxyl group-modified olefin-based polymer, which is obtained by bonding unsaturated carboxylic acid or its anhydride to olefin-based resin by addition reaction or grafting reaction. Examples of the carboxyl group-modified olefin-based polymer include maleic anhydride-graft modified polyethylene, maleic anhydride-graft modified polypropylene, maleic anhydride-graft modified ethylene-propylene block or random copolymer, maleic anhydride-graft modified ethylene-ethylacrylate copolymer, maleic anhydride-graft modified ethylene-vinyl acetate copolymer, maleic anhydride-modified cyclic olefin-based resin, maleic anhydride-graft modified olefin-based resin, and so on.

In the case where the polar group-modified polymer is a carboxyl group-modified olefin-based polymer, the carboxyl group content (i.e. modification amount) is usually from 0.01 to 10% by weight, preferably 0.01 to 5% by weight, more preferably 0.1 to 2% by weight, and further more preferably 0.2 to 1% by weight, based on the weight of olefin-based polymer as the polymer (p). When the modification amount is too small, the compatibility of the resulting resin composition is liable to be decreased. On the contrary, when the modification amount is too large, its reactivity with hydrophilic resin such as EVOH resin become too strong, and thereby causing to lead a defective appearance due to disturbed interface when being coextruded.

The polar group-modified olefin-based polymer has a melt flow rate (MFR: 210° C., load of 2160 g) of usually 0.01 to 150 g/10 minutes, preferably 0.1 to 50 g, 10 minutes, more preferably 1 to 25 g/10 minutes, particularly preferably 1.5 to 10 g/10 minutes, and MFR (230° C., load of 2160 g) of usually 0.01 to 200 g/10 minutes, preferably 1 to 35 g/10 minutes, particularly preferably 2 to 15 g/10 minutes.

As the polar group modified olefin-based polymer, commercially available one may be used. For instance, "Admer™", "Tafmer™" M series (Mitsui Chemical Corporation), "BYNEL™", "Fusabond™" (E.I. du Pont de Nemours and Company), "Orevac™" (Arkema Inc.), "Plexar™" (Equistar Chemicals), and "MODIC AP™" (Mitsubishi Chemical Corporation) are commercially available.

Such a polar group-modified polymer can act as an adhesive resin which increases a binding strength between hydrophobic resin such as olefin-based resin having no polar group and hydrophilic resin such as EVOH resin.

In the case of a multilayer structure in which vinyl alcohol-based resin such as EVOH resin as a gas-barrier layer is used together with hydrophobic resin layer for increasing strength and protecting the surface thereof, an adhesive resin layer of polar group-modified polymer is preferably interposed between the vinyl alcohol-based resin layer and the hydrophobic resin layer. In this case, a modification with carboxyl group or amino group-containing compound is preferred, and a modification with carboxyl group-containing compound is more preferred, for the polar group-modified polymer.

Preferably, the base resin (A) is any one of (A-1) polyamide-based resin, (A-2) olefin-based resin, or (A-3) polar group-modified polymer, depending on use and necessary property. A resin mixture containing another thermoplastic resin described earlier at an amount not inhibiting the necessary property or appropriate use, usually 30% by weight or less, may also be used as the base resin (A).

Saponified ethylene-vinyl ester-based copolymer (EVOH resin) is excluded from the thermoplastic resin used as the base resin (A). The EVOH resin is a water insoluble resin obtained by copolymerizing ethylene and vinyl ester-based monomer, and saponifying the obtained copolymer. In general, the EVOH resin has ethylene unit ranging from 20 to 60 mol % as a measurement value in accordance with ISO14663. Besides vinyl acetate, the vinyl ester-based monomer include aliphatic vinyl ester such as vinyl formate, vinyl propionate, vinyl valerate, vinyl butyrate, vinyl isobutyrate, vinyl pivalate, vinyl caprate, vinyl laurate, vinyl stearate, and vinyl versatate; and aromatic vinyl ester such as vinyl benzoate. Another monomer such as olefins, hydroxy group-containing α-olefins or its esterified or acylated product, dialkyl esters, (meth)acrylamides, N-vinylamides, vinyl cyanides, vinyl ethers, vinyl halide compounds, vinylsilanes, allyl halide, or allyl alcohols, may be copolymerized in EVOH resin at the rate of 10 mol % or less. Post-modified EVOH resins are also included. In short, EOVH resins enumerated in JP2014-204437A are excluded.

[(B) Hydrate-Forming Alkaline Earth Metal Salt]

The hydrate-forming alkaline earth metal salt (B) used for the invention has a property of taking in water molecule as crystallization water and satisfies water absorption property (α), preferably further satisfies water absorption property (β) and/or (γ) below.

Water Absorption Property (α):

The ratio ($X_5/Y$) is in the range of 0.2 to 2.0, preferably 0.5 to 2.0, more preferably 0.75 to 2.0, wherein Y is a content of crystallization water in maximum hydrate of the hydrate-forming alkaline earth metal salt (B), and $X_5$ is an amount of water absorption per 100 g of hydrate-forming alkaline earth metal salt (B) when the alkaline earth metal salt (B) is placed for 5 days under the condition of 40° C. and 90% relative humidity.

The maximum hydrate is a hydrate incorporating water molecule at maximum hydration number. The content of crystallization water, Y (g), is an amount of water that 100 g of anhydrous hydrate-forming alkaline earth metal salt (B) can incorporate in crystalline frame works thereof. Such a content of crystallization water (Y) is a specific value depending on type of alkaline earth metal salt and calculated by the formula below.

$$Y(g)=[\text{hydration number at maximum hydrate} \times 18]/(\text{molecular weight of its anhydrous})] \times 100$$

For example, in the case that calcium lactate ($C_6H_{10}CaO_6$: molecular weight of 218) is used as a hydrate-forming alkaline earth metal salt (B), the calculation is conducted as follows. Maximum hydrate of calcium lactate is pentahydrate, and Y is determined by the calculation below. The calculation result is Y=41 g.

$$Y=[(5\times18)/218]\times100=\text{about } 41$$

The content of crystallization water Y in the maximum hydrate corresponds to a water content of the hydrate-forming alkaline earth metal salt (B) in the form of maximum hydrate. The content Y is an indicator for maximum amount of water absorption by alkaline earth metal salt (anhydrous) used as the component (B), as well as an indicator for an amount of water held by the alkaline earth metal salt out of water intruded into base resin (A). The more water held by the alkaline earth metal salt out of water which the base resin (A) takes in, the less moisture absorption a hygroscopic layer contained in the multilayer structure would exhibit. Accordingly, the lager Y is the better. Preferable Y is 30 g or more, further 40 g or more, yet further 50 g or more.

On the other hand, regarding the hydrate-forming alkaline earth metal salt (B), maximum hydrate thereof is not always most stable. The hydrate capable of existing in the most stable state, i.e. most stable hydrate sometimes has less crystallization water than the maximum hydrate. For example, regarding trimagnesium dicitrate, nonahydrate is the most stable regardless of tetradecahydrate as its maximum hydrate.

The amount of water absorption per 100 g, $X_5$ is an amount of water absorption (unit: g) of 100 g hydrate-forming alkaline earth metal salt (B) when dehydrated hydrate-forming alkaline earth metal salt (B), i.e. anhydrous thereof is placed for 5 days under the condition of 40° C. and 90% relative humidity, and is calculated by the following formula.

$$X_5=[(\text{amount of water absorption for 5 days})/(\text{initial weight})]\times100$$

The "amount of water absorption for 5 days" is obtained by the calculation that the weight at 5th day from starting to be placed minus the initial weight.

The "initial weight" in the above formula corresponds to the weight of metal salt before actual use.

The "initial weight" and "weight at 5th day from starting to be placed" used in the calculation are actual measurement values, and obtained by weighing with mass measuring instrument such as electronic scales. Those values depend on types of alkaline earth metal salt as well as manufacturing method, presence or absence of crystallization water, chemical condition, and the like.

In the case of using anhydrous of hydrate-forming alkaline earth metal salt as the component (B), theoretical water content should be 0 g. However, the initial weight employed in the formula include a trace amount of moisture, because the initial weight is determined by actually weighing the substance as a completely dehydrated compound in equilibrium condition with use of thermogravimetric analyzer ("Pyris 1 TGA" from Perkin Elmer Co., Ltd.) or the like analyzer.

The amount of water absorption $X_5$ is usually from 10 to 200 g, preferably from 20 to 100 g, particularly preferably from 30 to 75 g. Alkaline earth metal salt having a large amount of water absorption $X_5$ tends to take in moisture beyond necessary amount for forming stable hydrate, and therefore, blister tends to generate when the multilayer structure is placed under a high humidity condition. On the other hand, alkaline earth metal salt having a small amount of water absorption $X_5$, which merely traps small amount of moisture regardless of amount intruded into base resin, is liable to impair gas-barrier performance after a hot water treatment or retort treatment.

The ratio $X_5/Y$, which is a ratio of water absorption amount $X_5$ to crystallization water content Y as defined above, indicates a rate of water absorption amount for 5 days to water amount stably held by hydrate-forming alkaline earth metal salt used as the component (B). The ratio is an indicator relating to the occurrence of defective appearance when a multilayer structure is placed under a high humidity condition. Alkaline earth metal salt having $X_5/Y$ within the above range has an appropriate water-absorbing capacity and does not absorb extra water. While hydrate-forming alkaline earth metal salt having unduly large $X_5/Y$ takes in moisture beyond the water receptivity within which alkaline earth metal salt can exist stably. This extra water absorption would be cause for defective appearance. On the contrary, hydrate-forming alkaline earth metal salt having unduly small $X_5/Y$ has small receptivity for moisture intruded into a base resin. This results in that another layer having hygroscopicity in the multilayer structure absorbs the moisture instead of the base resin.

Water absorption property (β): amount of water absorption (Z) per 100 g of the hydrate-forming alkaline earth metal salt (B) when being placed for 24 hours under the condition of 40° C. and 90% relative humidity is 10 g or more, preferably 30 g or more, further preferably 50 g or more.

Z is expressed as an amount of water absorption (g) that 100 g hydrate-forming alkaline earth metal salt (B) absorbs while being placed for 24 hours under the condition of 40° C. and 90% relative humidity.

The alkaline earth metal salt having relatively low amount of water absorption Z has insufficient capacity for moisture intruded into a base resin (A), and water absorption by other layer having high hygroscopicity would become dominant.

Water absorption property (γ): a local maximum point exists in the amount of water absorption when the alkaline earth metal salt (B) is placed under the condition of 40° C. and 90% relative humidity.

In the case that increasing tendency changes to decreasing tendency in an amount of water absorption while being placed for 6 days under high-temperature and high-humidity condition such as 40° C. and 90% relative humidity, the turning point is defined as local maximum point.

For example, in the case that the amount of water absorption (X) is measured every 24 hours while being placed, amount of water absorption Xn is the amount absorbing water for n days, which is determined by the calculation: (weight at n-th day)−(initial weight). The amount of water absorption at the next day, (n+1)-th day, denotes $X_{n+1}$. If the $X_{n+1}$ is smaller than Xn, a local maximum point exists.

Accordingly, the water absorption property (γ) means that hydrate-forming alkaline earth metal salt (B) absorbs water up to the local maximum point and then discharge water once trapped. This means that the hydrate-forming alkaline earth metal salt (B) can suppress excessive water absorption after absorbing an intended amount of water. According to the water absorption property (γ), hydrate-forming alkaline earth metal salt (B) can avoid self-dissolution in water absorbed by itself. If a stable hydration number is lower than the maximum hydration number in the case of a hydrate-forming alkaline earth metal salt, the hydrate-forming alkaline earth metal salt absorbs water up to the state having largest hydration number and thereafter discharging water once absorbed towards the stable state. Thus the amount of water absorption would be adjusted.

A hydrate-forming alkaline earth metal salt (B) satisfying the aforementioned water absorption properties can trap water intruded in the base resin (A), and thereby suppressing the deterioration of performances of hygroscopic layers due to their moisture absorption. In addition, the hydrate-forming alkaline earth metal salt can avoid absorbing extra water beyond their moisture receptivity, or discharge extra water after absorbing excessive amount of moisture to attain the stable state. As a result, even when the multilayer structure is exposed to high-temperature and high-humidity condition for long hours, the multilayer structure can avoid impairing appearance and thereafter maintain excellent appearance.

Hydrate-forming alkaline earth metal salt (B) satisfying the aforementioned water absorption properties includes, for instance, carboxylates such as lactate (e.g. calcium lactate [pentahydrate]), citrate (e.g. calcium citrate [tetrahydrate], trimagnesium dicitrate [tetradecahydrate], magnesium hydrogen citrate [pentahydrate]): silicate (magnesium silicate [pentahydrate]), phosphate (trimagnesium phosphate [octahydrate]), carbonate (basic magnesium carbonate [heptahydrate]) and so on. The term in brackets indicates the hydrate having maximum hydration number. These hydrate-forming alkaline earth metal salt (B) may be used alone or in a combination with them.

The hydrate-forming alkaline earth metal salt (B) used in the invention is an alkaline earth metal salt such the stable state having hydration number of usually 1 to 20, preferably 3 to 18, particularly preferably 5 to 15. In general, the smaller crystallization water content of the stable alkaline earth metal salt means that the alkaline earth metal salt would have lower receptivity of water taken in.

A completely or partially dehydrated compound of such alkaline earth metal salt maximum hydrate may be used for a drying agent as the component (B). The completely dehydrated compound (i.e. anhydrous) has no crystallization water, and the partially hydrated compound contains less crystallization water than that of stable hydrate. Partially dehydrated or partially hydrated one can satisfy the aforementioned water absorption properties as long as they have crystallization water content less than 50%, preferably 30% or less, particularly 10% or less based on the maximum hydration content.

Anhydrous or partially hydrate of hydrate-forming alkaline earth metal salt (B) may be produced by completely or partially dehydrating an alkaline earth metal salt hydrate. Alternatively a commercially available alkaline earth metal salt anhydrous or partially hydrate may be used. In short, any hydrate-forming alkaline earth metal salt satisfying the aforementioned water absorption property (α), preferably at least one of water absorption properties (β) and (γ) may be used.

The actual water content of the anhydrous hydrate-forming alkaline earth metal salt (B) (i.e. completely dehydrated alkaline earth metal salt) or partially hydrate thereof (i.e. partially dehydrated alkaline earth metal salt) is not always consistent with theoretical content calculated based on its chemical formula. For example, theoretical amount of water absorption of anhydrous alkaline earth metal salt (i.e. completely dehydrated compound) is 0 because of no crystallization water, however, the water content determined through thermogravimetric analysis is often more than 0% by weight due to moisture absorption. In another example, the water content of completely dehydrated trimagnesium dicitrate determined through thermogravimetric analysis falls in the range of about 0 to 10% by weight. This seems to result from moisture absorption by the anhydrous. Regarding a completely dehydrated compound, the water content determined through thermogravimetric analysis is preferably in the range of about 0 to 5% by weight even when the completely dehydrated compound absorbs moisture in the atmosphere.

An actual water content of the compound may be determined by, for example, thermogravimetry apparatus ("Pyris 1 TGA" from Perkin Elmer Co., Ltd.). The measurement value of water content is represented by percentage of water amount to the weight of the compound, which is percentage of water amount quantified at the time that no change is attained in monitoring the weight with time.

Among the aforementioned alkaline earth metal salts (B), completely dehydrated alkaline earth metal salts (B) selected from the group consisting of calcium lactate, magnesium silicate, trimagnesium phosphate, and alkaline earth metal salt of citric acid are preferably used. Alkaline earth metal salt of citric acid, in particular, completely dehydrated magnesium citrate is preferred because of satisfaction of the water absorption property (γ) and suppression of excess moisture absorption.

A common hydrate-forming alkaline earth metal salt (B) is in the form of powder, which has a particle-size distribution of 50 volume % or more, preferably 80 volume % or more, particularly preferably 95 volume % or more of particles passing through 120 mesh screen, in terms of determining according to PSTM E11-04. The particle-size distribution provides an indication of dispersibility in base resin (A). The higher percentage of particles passing through 120 mesh screen indicates excellent in dispersibility. Unduly low percentage of particles passing through 120 mesh screen tends to impair appearance of the final multilayer structure.

The hydrate-forming alkaline earth metal salt (B) of citric acid having aforementioned properties can suppress water absorption beyond its receptivity under a high-temperature and high-humidity condition while still possessing high receptivity of moisture absorption. If a multilayer structure where a layer of the resin composition comprising a base resin (A) and hydrate-forming alkaline earth metal salt (B) is contained together with a hygroscopic layers (e.g. gas-barrier layer of EVOH resin layer) is placed under a high-temperature and high-humidity condition, the resin composition layer dominantly absorbs moisture and thereby reducing defects such as defective appearance or impaired performance. This means a multilayer structure having excellent moisture resistance as a whole can be produced.

According to the invention, hydrate-forming alkaline earth metal salt (B) is preferably dispersed in base resin (A).

The resin composition of the invention has a content ratio in weight of base resin (A)/hydrate-forming alkaline earth metal salt (anhydrous) (B), i.e. weight ratio (A/B), is in the range usually between above 50/below 50 and 99/1 (i.e. more than 50/50 but 99/1 or less), preferably between 70/30 and 97/3, particularly preferably between 85/15 and 92/8. The unduly high ratio tends to reduce the effect of trapping moisture intruding into base resin (A), and therefore would not provide sufficient moisture resistance. On the contrary, unduly low ratio, which means the content of alkaline earth metal salt (B) is larger relative to that of base resin (A), lowers fluidity and extrusion moldability of the resin composition.

[(C) Additive]

The resin composition of the invention may contain, in addition to the components (A) and (B), the following compound according to needs.

The total content of the additive in the resin composition is preferably within the range of not inhibiting the effect of the invention, for example, 30% by weight or less, preferably 10% by weight or less, based on the weight of the resin composition.

(C-1) Dispersing Agent

Dispersing agent is preferably contained in the resin composition for improving dispersibility of the alkaline earth metal salt (B) in the base resin (A). As for the dispersing agent, any one conventionally used in a resin composition may be used. Examples of the dispersing agent include higher fatty acid (e.g. lauric acid, myristic acid, palmitic acid, stearic acid, behenic acid, oleic acid), higher fatty acid metal salt (e.g. aluminum salt, calcium salt, zinc salt, magnesium salt, or barium salt of higher fatty acid such as stearic acid), higher fatty acid ester (e.g. glyceride, methyl ester, isopropyl ester, butyl ester, octyl ester of higher fatty acid), higher fatty acid amide (e.g. saturated aliphatic amide such as stearamide and behenamide, unsaturated fatty acid amide such as oleamide and erucamide, and bis-fatty acid amide such as ethylene bis stearamide, ethylene bis oleamide, ethylene bis erucamide, and ethylene bis lauramide), low molecular weight polyolefin (e.g. low molecular weight polyethylene or low molecular weight polypropylene, both having molecular weight of 500 to 10,000, and its acid-modified product), higher alcohol, ester oligomer, fluorinated ethylene resin, and so on.

Of these additives, alkaline earth metal salt or transition metal salt of higher fatty acid having from 12 to 20 carbon atoms, especially calcium, magnesium or zinc salt of stearic acid, hydroxy stearic acid, oleic acid, or lauric acid in the case of focusing on reduction of foreign matter kept out from phase.

The amount of the dispersing agent in the resin composition is preferably from 0.00001 to 5% by weight, more preferably 0.0001 to 2.5% by weight, further more preferably 0.001 to 1% by weight.

(C-2) Planar Inorganic Filler

Examples of the planar inorganic fillers include kaolin, mica, smectite, talc, and so on. Kaolin is a planar particle of hydrous aluminum silicate as a main component. Mica and smectite are layered silicic acid mineral. Talc consists of magnesium hydroxide and silicate. A preferable planar inorganic filler is kaolin. Types of kaolin and calcination are not limited, but calcined kaolin is preferred.

These planar inorganic fillers can inhibit the penetration of moisture. Specifically, the planar filler would be present in the resulting film such that the plane of the filler is oriented along the plane direction of the film. It is supposed that the planar inorganic filler oriented along the plane direction of the film would contribute to block the penetration of moisture into the resin composition layer. Accordingly, arranging the inventive resin composition layer as a surface layer, and hygroscopic layer which is a layer of a hygroscopic resin as an inner layer of the multilayer structure can suppress lowering the performances caused by moisture absorption by the hygroscopic layer. In other words, improvement of moisture resistance by the inventive resin composition can be obtained.

The amount of the planar inorganic filler relative to the base resin (A) is from usually 1 to 20% by weight, preferably 3 to 20% by weight, more preferably 5 to 15% by weight.

(C-3) Oxygen Scavenger

The resin composition of the present invention may further contain an oxygen scavenger for giving the resin composition oxygen barrier performance.

The oxygen scavenger is a compound or composite which traps oxygen faster than the wrapped article. Specifically, the oxygen scavenger includes inorganic-based oxygen scavenger, organic oxygen scavenger, and composite type oxygen scavenger which is an assembly of inorganic catalyst and organic compound.

The inorganic-based oxygen scavenger includes metal and metal compound, which traps oxygen through the reaction with oxygen. A metal which has an ionization tendency larger than hydrogen, such as Fe, Zn, Mg, Al, K, Ca, Ni, and Sn is preferably used for metal for inorganic-based oxygen scavenger. Iron is typically used. Powdered metal is preferably used. Iron powder includes reduced iron powder, atomized iron powder, electrolyte iron powder, and the like. Conventionally known iron powder may be used without depending on its production method. An oxidized iron is reduced to be utilized for oxygen scavenger. Oxygen-defective type metal compound is also used. Examples of oxygen-defective type metal compound include cerium oxide ($CeO_2$), titanium oxide ($TiO_2$), zinc oxide (ZnO) and so on, from which oxygen are abstracted through reduction to become oxygen-defective state. A substance in such oxygen-defective state captures oxygen through the reaction with oxygen in air. These metals and metal compounds may be used together with a reaction accelerator such as metal halide and the like.

Examples of the organic oxygen scavenger include hydroxyl group-containing compound, quinone-based compound, double bond-containing compound, and easily oxidizable resin. These compounds contain hydroxyl group or double bond, which reacts with oxygen, thereby eliminating oxygen. Preferable organic oxygen scavenger includes ring-opened polymer of cycloalkane such as polyoctenylene, polyconjugated diene such as butadiene polymer or cyclized product thereof.

Composite type oxygen scavenger is a combination of transition metal catalyst and organic compound. The transition metal catalyst excites oxygen and allows the organic compound to react with oxygen, thereby eliminating oxygen. The organic compound in the composite type oxygen scavenger can react with oxygen faster than wrapped articles such as food, as a result, the composite type oxygen scavenger captures oxygen which comes into the resin composition. Transition metal constituting the transition metal-based catalyst is selected at least one from the group consisting of titanium, vanadium, chromium, manganese, iron, cobalt, nickel, copper, zinc, zirconium, ruthenium, and palladium. Particularly, cobalt is preferred from the viewpoint of compatibility with resin, catalyst function, and safety. Preferable organic compound includes ring-opened polymer of cycloalkenes such as polyoctenylene, polymer of conjugated diene such as butadiene, and cyclized product thereof. Preferable other organic compound includes nitrogen-containing resin such as MXD nylon, tertiary hydrogen-containing resin such as polypropylene, polyalkylene ether bond-containing resin such as block copolymer having poly-alkylene ether unit, and anthraquinone polymer.

The content of the transition metal-based catalyst relative to the organic compound is in the range of 0.0001 to 5% by weight, preferably 0.0005 to 1% by weight, more preferably 0.001 to 0.5% by weight, as the mass of metal based on the mass of organic compound.

(C-4) Other Additive

In addition to the above compounds, the resin composition of the invention may contain a known additive according to needs, within the amount not inhibiting the effect of the invention, for example, 5% by weight or less based on the total weight of the resin composition. Examples of the known additive include plasticizer such as ethylene glycol, glycerin, hexanediol, and a like aliphatic polyalcohol: lubricant such as saturated aliphatic amide (e.g. stearamide), unsaturated fatty acid amide (e.g. amide oleate), bis-fatty acid amide (e.g. ethylene bis stearamide), and low molecular weight polyolefin (e.g. low molecular weight polyethylene or low molecular weight polypropylene, both having a molecular weight of 500 to 10000): antiblocking agent; antioxidant: colorant; antistatic agent; ultraviolet absorber; antibacterial agent; insoluble inorganic salt (e.g. hydrotalcite): filler (e.g. inorganic filler); surfactant, wax; conjugated polyene compound, ene diol group-containing substance (e.g. phenols such as propyl gallate), and aldehyde compound (e.g. unsaturated aldehydes such as crotonaldehyde).

Of these additives, in the case of focusing on reduction of foreign matter kept out from phase, hydrotalcites represented by the formula (H1) or (H2) is preferably contained at a concentration of 0.00001 to 1 parts by weight relative to 100 parts of the resin composition. In particular, solid solution derived from hydrotalcite (H2) is preferable.

$$M_xAl_y(OH)_{2x+3y-2z}(E)_z \cdot aH_2O \quad (H1)$$

In the formula, M represents Mg, Ca or Zn, E represents $CO_3$ or $HPO_4$, and x, y, and z are independently positive numbers, and a is 0 or a positive number.

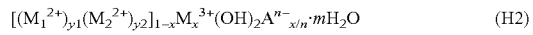

$$[(M_1^{2+})_{y1}(M_2^{2+})_{y2}]_{1-x}M_x^{3+}(OH)_2A^{n-}{}_{x/n} \cdot mH_2O \quad (H2)$$

In the formula, $M_1^{2+}$ is at least one metal selected from the group consisting of Mg, CpSr, and Ba; $M_2^{2+}$ is at least one metal selected from the group consisting of Zn, Cd, Pb, and Sn; $M_x^{3+}$ represents a trivalent metal: $A^{n-}$ is n valent anion; x, $y_1$, $y_2$, and m is a positive number satisfying the respective relation: $0<x\leq0.5$, $0.5<y_1<1$, $y_1+y_2=1$, and $0\leq m<2$.

<Method of Preparation of Resin Composition>

For mixing the hydrate-forming alkaline earth metal salt (B) with the base resin (A), melt-kneading operation or mechanical mixing operation (pellet dryblend) is typically employed, and melt-kneading operation is preferably employed. Specifically, the mixing operation is conducted by melting a mixture obtained by dryblending components and melt mixing, or by mixing a hydrate-forming alkaline earth metal salt (B) with molten base resin (A).

The resin composition of the invention may be directly applied to a molding and forming process to produce a molded article. Alternatively, after preparing a masterbatch which contains partially or completely dehydrated alkaline earth metal salt hydrate at a relatively high concentration, and diluting the masterbatch with a base resin when molding, the resulting resin composition may be applied to the production of a molded article. The content ratio of base resin (A) to hydrate-forming alkaline earth metal salt (B) in masterbatch, i.e. (A/B), is usually from 10/90 to less than 50/more than 50.

The mixing operation is a way of, for example, (1) simultaneously blending component (A) and component (B); or (2) adding excessive amount of component (B) to component (A) to produce a masterbatch of the component (B), and diluting the masterbatch by adding base resin (A) to obtain an intended composition.

The method (1) is usually employed, but the method (2) is preferable because of cost reduction in transportation. The content ratio of the base resin (A) to the masterbatch, weight ratio of (A/masterbatch), is usually from 10/90 to 99/1, preferably from 20/80 to 95/5, more preferably from 30/70 to 90/10, depending on the composition of the masterbatch.

The components may be mixed by any blending method such as dry blending with a banbury mixer, melt-kneading with uniaxial or biaxial extruder, and then pelletizing. The melt-mixing is carried out at a temperature of usually 150 to 300° C., preferably 170 to 250° C.

A resin composition of the invention can be prepared by a method comprising immersing base resin (A) into an aqueous solution of hydrate-forming alkaline earth metal salt (B) to impregnate the resin(s) with the compound (B), followed by drying the resultant. However, this method (impregnating method) is hard to be employed because this impregnation may impair the hydrate-forming alkaline earth metal salt (B) in a molded article made from the resulting resin composition.

A resin composition of the invention can be also prepared by a method comprising adding a stable hydrate of the alkaline earth metal salt (B) to base resin (A) and melt-kneading, followed by evaporating the hydration water of the alkaline earth metal salt hydrate. However, the method is hard to be employed because foaming tends to occur in the resulting resin composition.

The resin composition of the invention which is prepared by melt-kneading raw materials may be directly supplied to a mold for a molded article. However, a preferable method of producing a molded article is conducted by pelletizing the resin composition after melt-kneading raw materials and supplying the obtained pellets to a melt molding machine from the viewpoint of industrial handleability. From the economic view, a preferable method of producing pellets of the resin composition comprises melt-kneading with an extruder, extruding the resin composition in a strand form, and cutting the strand.

The pellets may have a shape of sphere, circular cylinder, cube, cuboid and other like shape. The common shape is sphere or rugby ball-like shape, or circular cylinder. According to the convenience, the pellet size used as molding material is as follows: in the case of sphere, its diameter is usually between 1 mm and 6 mm, preferably between 2 mm and 5 mm, and in the case of circular cylinder, its diameter of the circular bottom is usually between 1 mm and 6 mm, preferably 2 mm and 5 mm, and its length is usually between 1 mm and 6 mm, preferably between 2 mm and 5 mm.

Adhering lubricant on a surface of the resin composition pellet is preferred for stabilizing the feeding property of the resin composition when melt-molded. As the lubricant, higher fatty acid (e.g. lauric acid, myristic acid, palmitic acid, stearic acid, behenic acid, oleic acid, and so on), metal salt of higher fatty acid salt (e.g. aluminum salt, calcium salt, zinc salt, magnesium salt or barium salt of higher fatty acid), higher fatty acid ester (e.g. methyl ester, isopropyl ester, butyl ester, or octyl ester of higher fatty acid), higher fatty acid amide (e.g. saturated aliphatic amide such as stearamide and behenamide, unsaturated aliphatic amide such as oleamide and erucamide, bis-fatty acid amide such as ethylene bis stearamide, ethylene bis oleamide, ethylene bis erucamide, ethylene bis lauramide), low molecular weight polyolefin (e.g. low molecular weight polyethylene or low molecular weight polypropylene each having a molecular weight of 500 to 10,000, or its acid-modified compound), higher alcohol, ester oligomer, and fluorized ethylene resin. Higher fatty acid and/or metal salt, ester, and amide thereof are preferred, and higher fatty acid metal salt and/or higher fatty acid amide is more preferred.

Any state of lubricant such as solid (e.g. microparticles, fine powder, flake etc.), semi-solid, liquid, paste, solution, emulsion (aqueous dispersion) and the like may be used. An emulsion of the lubricant is preferably used because of the efficiency of the production of desired pellets of the resin composition.

The amount of the lubricant adhering to the pellet is selected from the range of 10 to 1000 ppm, preferably 20 to 500 ppm, particularly preferably 50 to 250 ppm, based on the resin composition pellet, from the viewpoint of stable feeding in melt-molding process.

<Melt-Molded Article>

The resin composition of the invention is formed into film, sheet, cup, bottle and so on through melt-molding. The melt-molding method includes extrusion molding process (T-die extrusion, tubular (blown) film extrusion, blow molding, melt spinning, contour extrusion etc.), injection molding process, and the like. The melt-molding temperature is selected from the range of usually 150 to 300° C.

A melt-molded article from the resin composition of the invention may be directly applied to various applications. In this case, the layer of the resin composition has a thickness of usually 1 to 5000 μm, preferably 5 to 4000 μm, particularly preferably 10 to 3000 μm.

In a typical melt-molded article from the resin composition of the invention, the hydrate-forming alkaline earth metal (B) is dispersed in the base resin (A).

<Multilayer Structure>

A multilayer structure of the invention comprises at least one layer of the resin composition (resin composition layer). For more detail, the multilayer structure employing the resin composition layer together with a layer of a thermoplastic resin or its composition which does not contain hydrate-forming alkaline earth metal salt (B) (hereinafter the layers is called as "layer absent component B", for distinguishing from the layer of the inventive resin composition. The main resin used for the layer absent component B is properly selected depending on an intended properties such as strength, protection of surface, gas-barrier performance, or a like property, which are imparted on the multilayer structure.

(1) Layer Absent Component B

Thermoplastic resin for the layer absent component B may be, for example, polyolefin-based resin in a broad sense such as polyethylene-based resins such as linear low density polyethylene, low density polyethylene, very low density polyethylene, medium density polyethylene, high density polyethylene, ethylene-propylene block- or random-copolymer, ethylene-α-olefin (having 4 to 20 carbon atoms) copolymer; polypropylene-based resins such as polypropylene, propylene-α-olefin (having 4 to 20 carbon atoms) copolymer, polybutene, polypentene, polycyclic olefin-based resin which has cyclic olefin structure in main chain and/or side chain, and other unmodified polyolefin-based resin; unsaturated carboxylic acid-modified polyolefin-based resin which is polyolefin graft-modified with unsaturated carboxylic acid or its ester, and other modified polyolefin-based resin; ionomer, ethylene-vinyl acetate copolymer, ethylene-acrylic acid copolymer, ethylene-acrylate copolymer, polyester-based resin, polyamide-based resin including copolyamide, polyvinyl chloride, polyvinylidene chloride, acryl-based resin, polystyrene, vinyl ester-based resin, polyester-based elastomer, polyurethane-based elastomer, polystyrene-based elastomer, halogenated polyolefin such as chlorinated polyethylene and chlorinated polypropylene, and aromatic or aliphatic polyketones. Polar group-modified polymer, which is obtained by modifying a polymer containing unit derived from aliphatic hydrocarbon monomer having carbon-carbon double bond with a polar group-containing compound, may be also used.

Typical raw material of the thermoplastic resin is naphtha and other material derived from petroleum. Also, a material derived from natural gas such as shale gas, sugar or starch contained in sugar cane, sugar beet, corn, and potato, and defecated material derived from cellulose contained in rice, wheat, millet and other plant may be used as a raw material for the substrate resin.

Such resins may be used alone or in a combination of two or more of resins. Not only virgin resin but also recycled resin may also be employed. The recycled resin is obtained by re-melt molding waste edges or scraps generated in the production of a multilayer structure, and is a mixture of various resins.

In short, the thermoplastic resin used for the layer absent component B is a thermoplastic resin enumerated for the base resin (A) of the resin composition. Although EVOH resin is excluded from the base resin (A) in the resin composition of the invention, an EVOH resin may be used as the thermoplastic resin.

A polar group-modified polymer as one of the thermoplastic resins can increase the binding strength between hydrophobic resin such as olefin having no polar group-based resin and hydrophilic resin such as EVOH resin. This is the polar group-modified polymer can make a role of binder between them.

In the case of a multilayer structure in which vinyl alcohol such as EVOH resin-based resin layer is used for gas barrier layer and hydrophobic resin layer for increasing strength and protecting its surface, an adhesive resin layer made of polar group-modified polymer is usually interposed between the vinyl alcohol-based resin layer and hydrophobic resin layer.

A thermoplastic resins capable of exhibiting gas-barrier performance is a thermoplastic resin having oxygen permeability of 100 mL·20 μm/(m²·day·atm) or less, preferably 50 mL·20 μm/(m²·day·atm) or less, more preferably 10 mL·20 nm/(m²·day·atm) or less, measured according to JIS-K7126 (isopiestic method) at 20° C. and 65% relative humidity. In this specification, thermoplastic resins having the above-identified oxygen permeability is sometimes called as "gas-barrier resin".

When providing the multilayer structure with gas-barrier performance, a layer made of the above-mentioned gas-barrier resin, i.e. gas-barrier layer, is preferably employed in the multilayer structure.

Examples of the gas-barrier resin include vinyl alcohol-based resin such as polyvinyl alcohol resin (PVOH) and EVOH resin: polyamide resins such as polycaprolactam (nylon 6), metaxylene diamine/adipic acid copolymer (nylon MXD6): polyester resin such as polyethylene terephthalate (PET), polyglycolic acid (PGA), and aromatic-based liquid crystal polyester; polyvinylidene chloride (PVDC), poly-acrylonitrile copolymer (PAN), polyvinylidene fluoride, poly chlorotrifluoroethylene, and so on.

The gas-barrier resin may consist of resin alone or its resin composition. As long as a composition contains a gas-barrier resin, the composition may be a mixture of various kinds of resins.

Of these gas-barrier resins. PVOH resin, EVOH resin, nylon MXD6, PGA, PVDC, and PAN are preferably used because of excellent gas-barrier performance. EVOH resin is particularly preferred because of not only excellent gas-barrier performance but also excellent melt-molding property and binding strength to the layer of the inventive resin composition.

EVOH resin used is a saponified copolymer of ethylene and vinyl ester-based monomer and generally has a content of ethylene unit of 20 to 60 mol %, as a measurement value in accordance with ISO14663. Examples of vinyl ester-based monomers other than vinyl acetate include aliphatic vinyl esters such as vinyl formate, vinyl propionate, vinyl valerate, vinyl butyrate, vinyl isobutyrate, vinyl pivalate, vinyl caprate, vinyl laurate, vinyl stearate, and vinyl versatate; and aromatic vinyl esters such as vinyl benzoate. EVOH resin copolymer or post-modified EVOH resin may be used within 10 mol % or less of its content. The EVOH resin copolymer is EVOH-based resin obtained by copolymerizing other monomer such as other olefin; hydroxy group-containing α-olefins or its esterified or acylated product; dialkyl esters, (meth)acrylamides. N-vinylamides, vinyl cyanides, vinyl ethers, vinyl halide compounds, vinylsilanes, or allyl halide. The post-modification of EVOH resin includes urethanation, acetalization, cyanoethylation, or oxyalkylenation. An EVOH resin containing a structural unit shown in below formula (1), or 1,2-diol in a side chain-containing EVOH resin may be used.

[Formula 1]

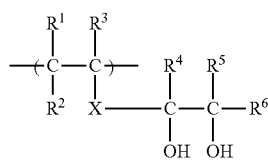

(1)

In the formula (1), $R^1$, $R^2$, and $R^3$ independently represent hydrogen atom or an organic group, and X represents single bond or a binding chain, and $R^4$, $R^5$, and $R^6$ independently represent hydrogen atom or an organic group.

Non-limiting examples of the organic group in the 1,2-diol structural unit of the formula (1) include a saturated hydrocarbon group such as methyl, ethyl, n-propyl, isopropyl, n-butyl, isobutyl, and tert-butyl: aromatic hydrocarbon group such as phenyl and benzyl group; halogen, hydroxyl, acyloxy, alkoxycarbonyl, carboxyl, sulfonic acid group, and so on.

$R^1$ to $R^3$ each is a saturated hydrocarbon group having from usually 1 to 30 carbon atoms, preferably 1 to 15 carbon atoms, more preferably 1 to 4 carbon atoms, or hydrogen atom. Of these, hydrogen atom is most preferred. $R^4$ to $R^6$ each is an alkyl group having from usually 1 to 30 carbon atoms, preferably 1 to 15 carbon atoms, further preferably 1 to 4 carbon atoms, or hydrogen atom. Of these, hydrogen atom is most preferred. In particular, it is most preferred that all of $R^1$ to $R^6$ are hydrogens.

The most preferable structure of 1,2-diol structural unit represented by the formula (1) is a structure where all $R^1$ to $R^6$ are hydrogen atoms and X is single bond, that is the structural unit of the formula (1a) below.

[Formula 1a]

(1a)

The layer absent component B may optionally contain an additive which is generally used for a thermoplastic resin in addition to the above-mentioned resin. Examples of the additives include drying agent, heat stabilizer, antioxidant, antistatic agent, colorant, ultraviolet absorber, lubricant, plasticizer, light stabilizer, surfactant, antibacterial agent, antiblocking agent, fire retardant, crosslinking agent, curing agent, foaming agent, crystal forming agent, anti-fogging agent, biodegradable agent, silane coupling agent, inorganic filler (e.g. kaolin, mica, and smectite), oxygen scavenger (inorganic-based oxygen scavenger and double bond-containing compound such as polyoctenylene) and the like.

The heat stabilizer may be used for the purpose of improving thermal stability in melt-molding and other physical properties. Examples of the heat stabilizer included an organic acid such as acetic acid, propionic acid, butyric acid, lauric acid, stearic acid, oleic acid, or behenic acid, or its alkali metal (e.g. sodium or potassium) salt, its alkaline earth metal (e.g. calcium or magnesium) salt, its zinc salt and so on; and an inorganic acid such as sulfuric acid, sulfurous acid, carbonic acid, phosphoric acid, or boric acid or its alkali metal (e.g. sodium or potassium) salt, its alkaline earth metal (e.g. calcium or magnesium) salt, its zinc salt and so on. Of these, acetic acid, phosphoric acid, boron compound such as boric acid, acetate, or phosphate is preferably added.

In the case of employing EVOH resin for gas-barrier resin, the amount of the acetic acid is usually from 0.001 to 1 part by weight, preferably from 0.005 to 0.2 part by weight, particularly preferably from 0.010 to 0.1 part by weight, based on 100 parts of EVOH resin, the amount of the boron compound is usually from 0.001 to 1 part by weight, preferably from 0.002 to 0.2 part by weight, particularly preferably from 0.005 to 0.1 part by weight, in terms of weight of boron, based on 100 parts by weight of EVOH resin. The amount of the acetate and phosphate (hydrogen phosphate included) is in the range of usually 0.0005 to 0.1 parts by weight, preferably 0.001 to 0.05 parts by weight, particularly preferably 0.002 to 0.03 parts by weight, as a mass of metal content by ICP emission analysis after incineration, based on 100 parts of EVOH resin. Unduly large amount tends to make difficult to produce layer absent component B with homogeneous quality.

(2) Layer Arrangement of Multilayer Structure

The multilayer structure comprises at least one layer of the resin composition of the invention and further comprises one or more of the layer absent component B depending on required properties.

In the case of comprising two or more of the resin composition layers, the resin composition layers may differ in type of resin composition. Also in the case of comprising two or more of layer absent component B, the layer absent component B may differ in their types.

Accordingly, layer arrangement of the multilayer structure may employ any optional arrangements, for instance, wherein I ($I_1$, $I_2$ . . . ) denotes an inventive resin composition layer, and II ($II_1$, $II_2$ . . . ) denotes layer absent component B used for providing strength to the resin composition layer, 2-layer arrangement such as I/II, 3-layer arrangement such as I/II/I and II/I/II, 4-layer arrangement such as I/$II_1$/$II_2$/I, and II/$I_1$/$I_2$/II, 5-layer arrangement such as $I_1$/II/$II_2$/II/$I_1$, $II_1$/I/$II_2$/I/$II_1$, $II_1$/$II_2$/I/$II_2$/$II_1$, and II/$I_1$/$I_2$/$I_1$/II, and $II_1$/$I_1$/$II_3$/$II_2$/$II_3$/$I_1$/$II_1$,$II_1$/$I_1$/$I_2$/$II_2$/$I_2$/$I_1$/$II_1$, and so on.

Focusing on property or function, layers constituting the multilayer structure are, for example, hygroscopic resin or its composition layer for increasing the strength, thermoplastic resin layer for protecting surface thereof, gas barrier layer for providing gas-barrier performance, adhesive resin layer for improving the binding strength between layers to be laminated, and their appropriate combination.

In the case that the multilayer comprises two or more resin composition layers, a combination of layers differing in their functions based on the kind of base resin (A) is allowed. For example, a combination of a layer ($I_1$) of hydrophobic resin such as polypropylene as the base resin (A) and an adhesive resin layer ($I_2$) of a polar group-modified polymer as the base resin (A) is possible.

In similar fashion, the layer absent component B may employ a combination differing in their functions, such as a combination of a layer absent component B ($II_1$) of hydrophobic resin (e.g. polypropylene) with a gas-barrier layer ($II_2$), and optionally with an adhesive resin layer ($II_3$) of a polar group-modified polymer is possible.

Moreover, a combination of various kinds of resin composition layer and various kinds of layer absent component B is also allowed. For example, in a case where an adhesive resin layer is comprised, both of a layer of resin composition containing component B and a layer absent component B, may be employed as an adhesive resin layer at the same time. In a case where two or more hydrophobic resin layers are comprised, a hydrophobic resin layer as an inventive resin composition layer as well as a hydrophobic resin layer as a layer absent component B may be employed at the same time.

The total number of the layers of the multilayer structure is in the range of usually 2 to 15, preferably 3 to 10 layers.

In the case that a base resin (A) of the resin composition layer employ a hydrophobic resin, a layer absent component B having a tendency to be lowered in performances due to moisture absorption, which is hereinafter referred to as "hygroscopic layer absent component B", is preferably chosen. The combination of the hygroscopic layer absent component B with the resin composition layer may avoid the hygroscopic layer absent component B from impairing performances caused by moisture absorption regardless of the absence of drying agent in hygroscopic layer absent component B. In this case, the inventive resin composition layer is preferably arranged so as to be adjacent to a hygroscopic layer absent component B. Because there is a tendency that the arrangement of the inventive resin composition layer closer to the hygroscopic layer absent component B can provide moisture resistance.

Accordingly, in the case that the hygroscopic layer absent component B is a gas-barrier layer mainly made of vinyl alcohol-based resin such as EVOH resin-based resin, employment of the inventive resin composition layer as an adhesive resin layer for the neighboring layer of hydrophobic resin used for protecting the surface or increasing the strength is effective. In other words, sandwiching the hygroscopic layer absent component B made of vinyl alcohol-based resin by the layers of the inventive resin composition whose base resin is a hydrophobic resin such as olefin-based resin achieves to avoid impairing gas barrier performance caused from hot water treatment such as retort treatment without affecting appearance of the resulting multilayer structure. In this case, the layer of hydrophobic resin may contain or not contain an alkaline earth metal salt as the component (B).

Accordingly, a particularly preferable multilayer structure has a layered unit where hygroscopic layer absent component B (II) is adjacent to the inventive resin composition layer, i.e. "resin composition layer (I)/hygroscopic layer absent component B (II)", especially the layered unit "resin composition layer (I)/hygroscopic layer absent component B (II)/resin composition layer (I)".

(3) Production of Multilayer Structure

Laminating the inventive resin composition layer over the layer absent component B (e.g. adhesive resin layer and gas barrier layer) may be performed by a known method. Examples of the lamination processes include extruding resin melt absent component B over a film or sheet of the inventive resin composition: extruding the inventive resin composition melt over a layer absent component B; coextruding the inventive resin composition and resin absent component B: dry-laminating the inventive resin composition (layer) and layer absent component B or gas barrier layer using a known adhesive such as organic titanium compound, isocyanate compound, polyester-based compound, or polyurethane compound; coating a solution of the inventive resin composition on layer absent component B, and then removing the solvent of the solution. Of these processes, coextrusion is preferably employed from the viewpoint of cost and environment.

Thus produced multilayer structure may be subjected to (thermal) stretching process if necessary. Uniaxial or biaxial stretching may be conducted in the stretching process. In the biaxial stretching, simultaneous or sequential stretching may be employed. For the stretching technique, roll stretching, tenter stretching, tubular stretching, stretch blow molding, vacuum-pressure forming and other stretching technique including high magnification stretching may be employed. The stretching temperature is selected from the range of usually 40 to 170° C., preferably 60 to 160° C., as a temperature nearby the multilayer structure. Unduly low stretching temperature causes insufficient stretching. Unduly high stretching temperature makes hard to maintain a stable stretched condition.

After stretching process, heat setting may be conducted for providing the multilayer structure with dimensional stability. A conventionally known technique for heat setting is employed. For example, the stretched film is heat set at usually 80 to 180° C., preferably 100 to 165° C. in the period of usually 2 to 600 seconds with keeping stretched condition.

In the case that thus obtained stretched multilayer film is used for shrink film, the stretched multilayer film is cooled in cold air for setting without heat setting treatment for the purpose of imparting thermal shrinkage property.

The multilayer structure of the invention may be formed to cup, tray and other multilayer container commonly by drawing. Specific examples of the drawing process include vacuum forming, air-pressure forming, vacuum-pressure forming, plug assist type vacuum-pressure forming, and so on. In the case of producing a multilayer container such as tube and bottle using a multilayer parison, blow molding method including extrusion blow molding method (e.g. twin-head type, mold shift type, parison shift type, rotary type, accumulator type, and horizontal parison type), cold parison blow molding method, injection blow molding method, biaxial stretching blow molding method (e.g. extrusion cold parison biaxial stretching blow molding method, injection cold parison biaxial stretching blow molding method, and injection inline biaxial stretching blow molding method). The parison is hollow tubular article preformed before blow molding. Thus produced multilayer structure may be subjected to, if necessary, heat treatment, cooling treatment, rolling treatment, printing treatment, dry laminating, solution or molten coating treatment, bag making finish, deep drawing finish, box making finish, tube finish, split finish and the like.

(4) Structure of Multilayer Structure

The thickness of the multilayer structure including a stretched multilayer structure as well as thicknesses of the respective layers constituting the multilayer structure, i.e. resin composition layer, layer absent component B such as gas barrier layer, and layer absent component B such as adhesive resin layer, vary with layer arrangement, types of resin for layer, adhesive resin type, use, package form, and intended physical properties. The thickness of multilayer structure including stretched multilayer structure is usually from 10 to 5000 µm, preferably from 30 to 3000 µm, particularly preferably from 50 to 2000 µm. The thickness of the resin composition layer is usually from 5 to 30000 µm, preferably 10 to 20000 µm, particularly preferably 20 to 10000 µm. The thickness of the layer absent component B is usually from 5 to 30000 µm, preferably from 10 to 20000 µm, particularly preferably from 20 to 10000 µm. The thickness of the gas barrier layer is usually from 1 to 500 µm, preferably 3 to 300 µm, particularly preferably 5 to 200 µm. The thickness of the adhesive resin layer is usually from 0.5 to 250 µm, preferably from 1 to 150 µm, particularly preferably from 3 to 100 µm.

The ratio of thicknesses of hygroscopic layer whose performance is impaired by moisture absorption to the resin composition layer in the multilayer structure, i.e. hygroscopic layer/resin composition layer, is usually from 1/99 to 99/1, preferably 5/95 to 95/5, particularly preferably 10/90 to 90/10. The thickness ratio of the layer absent component B to the resin composition layer in the multilayer structure, i.e. layer absent component B/resin composition layer, is from usually 1/99 to 99/1, preferably 5/95 to 95/5, particularly preferably 10/90 to 90/10. In these cases, if the hygroscopic layer, resin composition layer, or layer absent component B consists of multiple layers, the respective thickness of the respective thickest layer is employed for the aforementioned thickness ratio.

(5) Use

Thus produced film, sheet, container made from stretched film such as bag, cup, tray, tube, bottle, and cover are useful for various packaging or container for not only general food but also condiment such as mayonnaise, dressing, fermented food such as miso, oil and fat food such as salad oil, beverages, cosmetics, pharmaceuticals and so on.

Since the layer of the resin composition can give moisture resistance throughout a multilayer structure, the multilayer structure of the invention is particularly useful for a wrapping material containing gas barrier layer whose gas barrier performance may be impaired due to moisture absorption and use for wrapping foods to be subjected to hot water treatment.

EXAMPLE

The invention will be specifically explained with examples below, but these examples do not limit the invention as long as it does not exceed the gist of the invention.

The term "parts" in Examples is on the basis of weight unless otherwise indicated.

<Measurement and Evaluation Method>

[Water Absorption Property of Hydrate-Forming Metal Salt]

(1) Water Content of Hydrate-Forming Metal Salt

The water content of hydrate-forming metal salt was determined according to thermogravimetric analysis (TGA) with "Pyris1 TGA (Parkin-Elmer)".

The measurement value of the water content of a balanced compound whose weight has not been changed by discharging water upon continued heating was employed as the water content of completely dehydrated compound.

(2) Amount of Water Absorption Per 100 g Under the Condition of 40° C. and 90% RH: Xn (g)

A weight of hydrate-forming metal salt has been monitored while being left standing for 6 days under the condition of 40° C. and 90% relative humidity. Amount of water absorption per 100 g, Xn is an amount of water absorption for n days per 100 g hydrate-forming metal salt when being placed under the condition of 40° C. and 90% relative humidity for n days, and calculated according to the formula below.

$$Xn=[(\text{amount of water absorption for } n \text{ days})/(\text{initial weight})]\times 100$$

The "amount of water absorption for n days" is calculated by subtracting the initial weight from the weight of the sample weighed at n-th day from starting to be left standing, wherein the "initial weight" is a weight of the sample at starting point and "n" is a natural number selected from 1 to 6.

The "initial weight" and the "weight at n-th day from starting to be left standing" are weighed with use of a balance in a manner that the sample is put on a cup made of aluminum.

(3) Content of Crystallization Water of Maximum Hydrate: Y (g)

Content of crystallization water Y (g) of maximum hydrate was determined by the following calculation.

$$Y=[(\text{hydration number of maximum hydrate}\times 18)/(\text{molecular weight of anhydrous})]\times 100$$

The molecular weight of anhydrous is calculated based on the chemical formula of the anhydrous metal salt. The hydration number of maximum hydrate is indicated in bracket of respective compound below.

trimagnesium dicitrate [tetradecahydrate] and trisodium citrate [dihydrate]

(4) Amount of Water Absorption for 24 Hours when being Placed Under the Condition of 40° C. and 90% Relative Humidity: Z ([g/Hydrate-Forming Metal Salt 100 g]/Day)

For Z, an amount of water absorption at 1st day determined according to the aforementioned method (2), $X_1$, which was measurement value after leaving standing for entire day, was employed.

(5) Local Maximum Point in the Amount of Water Absorption

In the record of the change of the amount of water absorption while being left standing for 6 days under the condition of 40° C. and 90% relative humidity, if there is one day satisfying the following relationship, local maximum point in the amount of water absorption exists: Amount of water absorption $X_{n+1}$, which is an amount at (n+1)-th day from starting to be placed, is smaller than $X_n$ which is an amount at n-th day from starting to be placed.

[Properties of Resin Composition]

(6) Moisture Resistance

Resin composition pellets were left in a chamber where the temperature and humidity are set to 30° C. and 90% RH for 3 days, and thereafter the appearance of pellets were observed with eyes. No remarkable change of the appearance was assessed as "good".

[Evaluation of Multilayer Structure]

(7) Oxygen Permeability ($cc/m^2 \cdot day \cdot atm$) after Retort Treatment

A multilayer structure sample having a size of 10 cm in length and 10 cm in width was subjected to retort treatment in which the sample was immersed in hot water at 123° C. for 33 minutes with retort machine (HISAKA WORKS, Ltd.). The sample three days after the retort treatment was measured with respect to its oxygen transmission rate (23° C., internal relative humidity: 90%, external relative humidity: 50%) with use of oxygen transmission rate test system (OX-TRAN 2/20 from MOCON, Inc.).

(8) Moisture Resistance of the Multilayer Structure

A multilayer structure was left for 10 or 40 days in a chamber where the temperature and humidity are set to 40° C. and 90% RH, and thereafter the appearance of the multilayer structure was observed with eyes. No notably change of the appearance was assessed as "good".

[Type of Hydrate-Forming Metal Salt and Water Absorption Property Thereof]

The below-mentioned hydrate-forming metal salt used for examples were measured according to the above-mentioned method for water absorption property. Measurement result is shown in Table 1.

Trimagnesium dicitrate (completely dehydrated compound) was prepared from trimagnesium dicitrate (anhydride) (Aadhunik Industries), which had water content of 0.4% according to thermogravimetric analysis.

Trisodium citrate (completely dehydrated compound) was prepared from trisodium citrate (anhydride) (Iwata Chemical Co., Ltd.), which had water content of 0.4% according to thermogravimetric analysis.

Employment of trisodium citrate (as an alkali metal salt) resulted in large water absorption, which exceeded 2.0 of $X_5/Y$, while the employment of trimagnesium dicitrate (as an alkaline earth metal salt) had $X_5/Y$ ranging from 0.2 to 2.0 in together with the existence of local maximum point in the amount of water absorption. The tendency can be understood that the trimagnesium dicitrate once absorbed water exceeding the capacity holding as crystallization water and thereafter discharged the extra water to reduce the amount of water toward a stable hydrate.

[Preparation of Resin Compositions P1-P4 and Evaluation Thereof]

As the base resin (A), polypropylene resin ("Novatec® PP EA7AD" from Japan Polypropylene Corporation, MFR (230° C., load of 2160 g) of 1.4 g/10 minutes) or polyamide-based resin ("UBE nylon 1022B" from UBE Industries, Ltd.) was used.

The base resin and hydrate-forming metal salt were blended at a ratio as shown in Table 2, and the obtained mixture was put in a feeder to be melt-kneaded with twin-screw extruder having two mixing zones under the conditions below Thus prepared resin composition was extruded in a strand form and cut with drum type pelletizer, thereby obtaining columnar pellets each having diameter of 2 mm, length of 3.5 mm and volatile matter content of 0.05%.

Melt-kneading condition for production of resin compositions P1 through P4 twin-screw extruder: 32 mm diameter, L/D=56 (The Japan Steel Works, Ltd)

set temperature of extruder:
C2/C3/C4/C5/C6/C7/C8/C9/C10/C11/C12/C13/C14/C15/C16/D=110/140/200/230/230/230/230/230/230/230/230/230/230/230/230/230° C.

screw rotational frequency: 240 ppm discharge amount: 25 kg/hour cooling for strand: water cooling take-off speed: 20 m/min.

Thus produced resin composition pellets P1 through P4 were evaluated with respect to moisture resistance according to the evaluation method described earlier. The evaluation results are shown in Table 2.

TABLE 1

| | Metal salt | Water content (%) | Amount of water absorption at n-th day from starting to be placed under 40° C. and 90% RH | | | | | | Y | $X_5/Y$ | Z ($X_1$) | Local maximum point in amount of water absorption |
| | | | 1st ($X_1$) | 2nd ($X_2$) | 3rd ($X_3$) | 4th ($X_4$) | 5th ($X_5$) | 6th ($X_6$) | | | | |
| --- | --- | --- | --- | --- | --- | --- | --- | --- | --- | --- | --- | --- |
| Alkaline earth metal salt | Trimagnesium dicitrate | 0.4 | 78 | 98 | 103 | 98 | 75 | 52 | 56 | 1.34 | 78 | Presence |
| Alkali metal salt | Trisodium citrate | 0.4 | 61 | 134 | 186 | 202 | 213 | 223 | 14 | 15.21 | 61 | Absence |

Trimagnesium dicitrate (Aadhunik Industries): completely dehydrated compound
Trisodium citrate (Iwata Chemical Co., Ltd.): completely dehydrated compound

TABLE 2

| Composition No. | Resin composition | | | | Evaluation of pellets |
|---|---|---|---|---|---|
| | Base resin | | Metal salt | | Appearance after |
| | Hydrophobic resin | Amount (part) | Kind | Amount (part) | placed at 30° C. and 90% (after 3 days) |
| P1 | PP | 90 | Trimagnesium dicitrate | 10 | Good |
| P2 | PA | 90 | Trimagnesium dicitrate | 10 | Good |
| P3 | PP | 90 | Trisodium citrate | 10 | Wet surface |
| P4 | PA | 90 | Trisodium citrate | 10 | Wet surface |
| Reference | PP | 100 | — | — | Good |

PP: Novatec™PPEA7AD
PA: UBE nylon1022B (nylon 6)

The compositions P1 and P2, each of which contained alkaline earth metal salt satisfying the water absorption property defined in the specification, exhibited dry surface after being placed under a high humidity condition. It can be supported that moisture absorption by the alkaline earth metal salt contained in the composition did not affect the appearance of surface of pellets.

The compositions P3 and P4, each of which contained alkali metal salt not satisfying the water absorption property defined in the specification, exhibited wet surface of pellets. As for Reference Example, which was resin alone without metal salt, an influence on appearance was not recognized. From these results, it was supposed that the trisodium citrate contained in the composition exhibited deliquescence by moisture absorption and bled out from the resin.

[Production of Resin Compositions P5 Through P8 and Evaluation Thereof]

As the base resin (A), maleic anhydride-modified polypropylene resin ("Admer™ QF500" from Mitsui Chemicals, Inc., MFR (230° C., load of 2160 g) of 3.0 g/10 minutes) or maleic anhydride-modified linear low density polyethylene ("Admer™ NF528" which is maleic anhydride-modified LLDPE from Mitsui Chemicals, Inc. MFR (210° C., load of 2160 g) of 2.2 g/10 minutes) was used. The polar group-modified polymer and hydrate-forming metal salt were blended at a ratio as shown in Table 3, and the obtained mixture was put into a feeder and melt-kneaded with a twin-screw extruder having two mixing zones under the same conditions as that of P1-P4. Thus prepared resin composition employing the polar group-modified polymer for the base resin was extruded in a strand form and cut with drum type pelletizer, thereby obtaining columnar pellets each having diameter of 2 mm, length of 3.5 mm and volatile matter content of 0.07%. Thus obtained pellets were evaluated with respect to moisture resistance according to the aforementioned evaluation method. The evaluation results are shown in Table 3.

TABLE 3

| Composition No. | Resin composition | | | | Evaluation of pellets |
|---|---|---|---|---|---|
| | Base resin | | Metal salt | | Appearance after |
| | Polar group-modified polymer | Amount (part) | Kind | Amount (part) | placed at 30° C. and 90% (after 3 days) |
| P5 | Maleic anhydride-modified PP | 90 | Trimagnesium dicitrate | 10 | Good |
| P6 | Maleic anhydride-modified LLDPE | 90 | Trimagnesium dicitrate | 10 | Good |
| P7 | Maleic anhydride-modified PP | 90 | Trisodium citrate | 10 | Wet surface |
| P8 | Maleic anhydride-modified LLDPE | 90 | Trisodium citrate | 10 | Wet surface |

Maleic anhydride-modified PP: Admer™QF500 (Mitsui Chemicals, Inc.)
Maleic anhydride-modified LLDPE: Admer™NF528 (Mitsui Chemicals, Inc.)

As shown in Table 3, the compositions P5 and P6, each of which contained alkaline earth metal salt satisfying the water absorption property defined in the specification, exhibited dry surface after being placed under a high humidity condition. While the compositions P7 and P8, each of which contained alkali metal salt not satisfying the water absorption property defined in the specification, exhibited wet surface of pellets.

From these results, the case where a polar group-modified polymer to be used as an adhesive resin was employed for the base resin, is similar to the case where an olefin resin without polar group-modification was employed for the base resin. The fact proves that moisture absorption by the alkaline earth metal salt contained in the composition did not affect the appearance of surface of pellets.

[Production of Multilayer Structures S1 Through S6 and Evaluation Thereof]

Multilayer Structures S1 Through S3:

Used were a resin composition (P1 or P3) employing polypropylene as the base resin: "Admer™ QF500" from Mitsui Chemicals Inc. as the adhesive resin; and saponified ethylene-vinyl acetate copolymer (MFR (210° C., load of 2160 g) of 4.3 g/10 minutes), which has 29 mol % in content of ethylene unit and 99.6 mol % in saponification degree, and 500 ppm in boric acid content calculated by boron content measured, as the gas-barrier resin.

3-type 5-layer multilayer structure was extruded under the conditions below with use of a coextrusion multilayer film forming apparatus equipped with three extruders, 3-type 5-layer type feedblock, a die for forming multilayer film and winder, and then cooled with a chill roll in which cooling water was circulated. The multilayer structure had the thickness of 320 μm and respective layer had thicknesses (μm) as follows: resin composition/adhesive resin/EVOH resin/adhesive resin/resin composition=120/20/40/20/120.

The multilayer structures S1 and S2 each comprises a resin composition layer containing the alkaline earth metal salt having water absorption property defined in the specification, and adhesive resin layer and gas-barrier layer both of which are layer absent component B. Therefore these multilayer structures were multilayer structures of the invention.

extruder for intermediate layer (EVOH resin): 40 mmφ single screw-type extruder (barrel temperature: 230° C.)

extruder for inside outer layer (resin composition): 40 mmφ single screw-type extruder (barrel temperature: 230° C.)

extruder for intermediate inside outer layer (adhesive resin): 32 mmφ single screw-type extruder (barrel temperature: 230° C.)

die: 3-type 5-layer type feedblock die (die temperature: 230° C.)

temperature of chill roll: 50° C.

Multilayer Structures S4 Through S6:

The inventive resin composition P5 or P7, which employs a polar group-modified polymer as a base resin, was used as an adhesive resin. As a layer absent component B, a hydrophobic resin layer was used for the surface layer of the multilayer structure. Except for these in the layer constitution, the same manner as the production of the multilayer structure S1-S3 was conducted. That is, 3-type 5-layer multilayer structure was extruded under the conditions described earlier with use of a coextrusion multilayer film forming apparatus, which is equipped with three extruders, 3-type 5-layer type feedblock, a die for forming multilayer film and winder to produce a multilayer structure having the total thickness of 320 μm and respective layer having thicknesses (μm) as follows: hydrophobic resin/resin composition/EVOH resin/resin composition/hydrophobic resin=120/20/40/20/120.

Thus produced multilayer structures S1 through S6 were evaluated with respect to oxygen permeability and moisture resistance after retort treatment according to aforementioned evaluation method. The evaluation results are shown in Table 4 and Table 5.

TABLE 4

| Multilayer structure No. | Resin composition | | | | Adhesive resin layer | Gas barrier layer | Evaluation of multilayer structure | |
|---|---|---|---|---|---|---|---|---|
| | Base resin | | Metal salt | | | | Oxygen permeability after retort treatment (cc/m² · day · atm) | Film appearance after placed at 40° C. and 90% (after 10 days) |
| | Kind | Amount (part) | Kind | Amount (part) | | | | |
| S1 | PP | 90 | Trimagnesium dicitrate | 10 | Maleic anhydride-modified PP | EVOH resin | 22 | Good |
| S2 | PP | 90 | Trisodium citrate | 10 | Maleic anhydride-modified PP | EVOH resin | 13 | Film became clouded Wet surface |
| S3 | PP | 100 | — | — | Maleic anhydride-modified PP | EVOH resin | 56 | Good |

PP: Novatec ™PPEA7AD
Maleic anhydride-modified PP: Admer ™QF500 (Mitsui Chemicals, Inc.)

TABLE 5

| Multilayer structure No. | Resin composition | | | | Hydrophobic resin layer | Gas barrier layer | Evaluation of multilayer structure | |
|---|---|---|---|---|---|---|---|---|
| | Base resin | | Metal salt | | | | Oxygen permeability after retort treatment (cc/m² · day · atm) | Film appearance after placed at 40° C. and 90% (after 40 days) |
| | Polar group-modified polymer | Amount (part) | Kind | Amount (part) | | | | |
| S4 | Maleic anhydride-modified PP | 90 | Trimagnesium dicitrate | 10 | PP | EVOH resin | 13 | Good |
| S5 | Maleic anhydride-modified PP | 90 | Trisodium citrate | 10 | PP | EVOH resin | 4.4 | Spots appeared |
| S6 | Maleic anhydride-modified PP | 100 | — | — | PP | EVOH resin | 56 | Good |

PP: Novatec ™PPEA7AD
Maleic anhydride-modified PP: Admer ™QF500 (Mitsui Chemicals, Inc.)

The multilayer structure S1 had a structure where gas-barrier layer (EVOH resin layer) was sandwiched by resin composition layers via adhesive resin layer, and the resin composition layer contained dehydrated alkaline earth metal salt (trimagnesium dicitrate) having $X_5/Y$ falling in the range of 0.2 to 2.0. The multilayer structure S1 exhibited gas barrier performance even after hot water treatment. In general, EVOH resin would be eluted by retort treatment and impair its gas barrier performance due to water absorption. However, using the EVOH resin layer together with the layer of the inventive resin composition in a multilayer structure, the resulting multilayer structure can avoid the EVOH resin layer from impairing the gas barrier performance.

Even when the multilayer structure S1 was placed for 10 days under high temperature and high humidity condition, an inferior appearance was not observed, which means moisture absorption by hydrate-forming alkaline earth metal salt (B) contained in the layer of the inventive resin composition did not affect the appearance of the multilayer structure.

The multilayer structure S2, which had a layer of the resin composition containing dehydrated trisodium citrate having $X_5/Y$ above 2.0, exhibited excellent gas barrier performance even after retort treatment probably thanks to moisture absorption by the metal salt. However, after being placed for 10 days under high temperature and high humidity condition, liquefied trisodium citrate bled out on the surface of the multilayer structure S2 and as a result, the multilayer structure became clouded entirely.

The multilayer structure S3, where employed hydrophobic resin (polypropylene) alone without metal salt as a drying agent instead of the resin composition of the invention, did not exhibit an inferior appearance after being placed under high temperature and high humidity condition. However, since there was no moisture absorption by the metal salt, the gas barrier layer absorbed water based on its inherent water absorption property by retort treatment and resulted in reducing the gas barrier performance of the multilayer structure.

The multilayer structure S5, employed an adhesive resin layer of adhesive resin containing a hydrate-forming alkali metal salt as a drying agent. Although the gas barrier layer and hydrophobic resin layer as the surface of the multilayer structure were layer absent component B. The multilayer structure S5 still exhibited oxygen barrier performance after retort treatment probably thanks to moisture absorption by hydrate-forming alkali metal salt contained in the resin composition used as the adhesive resin layer. However, after being placed for 40 days under high temperature and high humidity condition, spots appeared on the surface of the multilayer structure, which was problematic and cannot be utilized for wrapping film. The spots were supposed to be a liquefied alkali metal salt resulted from deliquescence and bleeding out from the adhesive resin layer.

The multilayer structure S4, which employed the inventive resin composition layer as an adhesive resin layer, exhibited a higher oxygen permeation amount after retort treatment than the multilayer structure S5, while exhibited amount of oxygen permeation less than about ¼ of that of multilayer structure S6 which employed an adhesive resin without drying agent. Furthermore, the appearance was not impaired even after being placed under high humidity condition. This means this multilayer structure could avoid lowering gas barrier performance due to moisture absorption without affecting the appearance required for wrapping film.

From the comparison of the multilayer structure S1 with S4, it is understood that the arrangement of the inventive resin composition layer adjacent to hygroscopic layer absent component B, which was a gas-barrier layer in this example, was effective for providing moisture resistance.

INDUSTRIAL APPLICABILITY

The resin composition of the invention can avoid affecting appearance regardless of moisture absorption. Therefore, a hygroscopic layer whose performance is reduced by moisture absorption can avoid lowering its performance caused from moisture absorption by combining with the inventive resin composition layer. The multilayer structure comprising a hygroscopic layer with the inventive resin composition layer would exhibit moisture resistance without affecting its appearance, which is advantage.

The invention claimed is:

1. A resin composition comprising:
   (A) a base resin consisting of a thermoplastic resin other than a saponified ethylene-vinyl ester-based copolymer; and
   (B) a hydrate-forming alkaline earth metal salt satisfying the water absorption properties shown below:
   (α) a ratio of $X_5$:Y from 0.2:1 to 2.0:1, wherein $X_5$ is an amount of water absorption for 5 days per 100g of the alkaline earth metal salt (B) when being placed for 5 days under a condition of 40° C. and 90% relative humidity, and Y is a content of crystallization water in maximum hydrate of the alkaline earth metal salt (B); and
   (γ) a local maximum point exists in the amount of water absorption when the hydrate-forming alkaline earth metal salt (B) is placed under the condition of 40° C. and 90% relative humidity.

2. The resin composition according to claim 1, wherein the hydrate-forming alkaline earth metal salt (B) satisfies water absorption property (β) shown below:
   (β) an amount of water absorption (Z) per 100 g of the alkaline earth metal salt (B) when being placed for 24 hours under the condition of 40° C. and 90% relative humidity is at least 10 g.

3. The resin composition according to claim 1, wherein the alkaline earth metal salt (B) is a salt of an acid selected from at least one of the group consisting of lactic acid, silicic acid, phosphoric acid, and citric acid, and the alkaline earth metal salt is completely dehydrated or partially dehydrated up to the water content of 50% by weight or less, or a combination thereof.

4. The resin composition according to claim 1 wherein a weight ratio (A:B) of the base resin (A) to the hydrate-forming alkaline earth metal salt (B) is from more than 50:50 to 99:1.

5. The resin composition according to claim 1, wherein the base resin (A) is a polyamide-based resin or an olefin-based resin.

6. The resin composition according to claim 1, wherein the base resin (A) is a polar group-modified polymer.

7. A multilayer structure comprising at least one layer of a resin composition comprising:
   (A) a base resin consisting of a thermoplastic resin other than a saponified ethylene-vinyl ester-based copolymer; and
   (B) a hydrate-forming alkaline earth metal salt satisfying the water absorption properties shown below:
   (α) a ratio of $X_5$:Y from 0.2:1 to 2.0:1, wherein $X_5$ is an amount of water absorption for 5 days per 100 g of the alkaline earth metal salt (B) when being placed for 5 days under a condition of 40° C. and 90% relative humidity, and Y is a content of crystallization water in maximum hydrate of the alkaline earth metal salt (B); and (γ) a local maximum point exists in the amount of water absorption when the hydrate-forming alkaline earth metal salt (B) is placed under the condition of 40° C. and 90% relative humidity.

8. A multilayer structure according to claim 7, further comprising a layer of a thermoplastic resin not containing a hydrate-forming alkaline earth metal salt (B) or a composition thereof.

9. A multilayer structure comprising a layer unit in which a layer of a thermoplastic resin not containing hydrate-forming alkaline earth metal salt (B) or a composition thereof is arranged adjacent to the layer of a resin composition comprising:
(A) a base resin consisting of a thermoplastic resin other than a saponified ethylene-vinyl ester-based copolymer; and
(B) a hydrate-forming alkaline earth metal salt satisfying the water absorption properties shown below:
(α) a ratio of $X_5$:Y from 0.2:1 to 2.0:1, wherein $X_5$ is an amount of water absorption for 5 days per 100 g of the alkaline earth metal salt (B) when being placed for 5 days under a condition of 40° C. and 90% relative humidity, and Y is a content of crystallization water in maximum hydrate of the alkaline earth metal salt (B); and (γ) a local maximum point exists in the amount of water absorption when the hydrate-forming alkaline earth metal salt (B) is placed under the condition of 40° C. and 90% relative humidity.

10. The multilayer structure according to claim 8, wherein the thermoplastic resin has 100 mL·20 μm/(m²·day·atm) or less of oxygen permeability at 20° C. and 65% relative humidity measured by an isopiestic method in accordance with JIS-K7126.

11. The multilayer structure according to claim 9, wherein the thermoplastic resin has 100 mL·20 μm/(m²·day·atm) or less of oxygen permeability at 20° C. and 65% relative humidity measured by an isopiestic method in accordance with JIS-K7126.

12. The multilayer structure according to claim 8, wherein the thermoplastic resin is a saponified ethylene-vinyl ester-based copolymer.

13. The multilayer structure according to claim 9, wherein the thermoplastic resin is a saponified ethylene-vinyl ester-based copolymer.

14. The multilayer structure according to claim 7, wherein the base resin (A) in the resin composition is a hydrophobic resin.

15. The multilayer structure according to claim 7, wherein the base resin (A) in the resin composition is a polar group-modified polymer.

* * * * *